(12) United States Patent
Principe et al.

(10) Patent No.: US 7,534,544 B2
(45) Date of Patent: May 19, 2009

(54) METHOD OF SEPARATING AN EXPOSED THERMAL TRANSFER ASSEMBLAGE

(75) Inventors: Frank S. Principe, Landenberg, PA (US); Edmund Francis Schieffer, Jr., Wilmington, DE (US); Ian Michael Garben, British Columbia (CA); Paul Holt, British Columbia (CA)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/975,418

(22) Filed: Oct. 19, 2007

(65) Prior Publication Data

US 2009/0105071 A1    Apr. 23, 2009

(51) Int. Cl.
    G03F 7/34     (2006.01)
    G03C 8/50     (2006.01)
(52) U.S. Cl. .................. 430/200; 430/7; 430/202; 430/207; 430/236
(58) Field of Classification Search .............. 430/7, 430/200, 202, 207, 236
See application file for complete search history.

(56) References Cited

U.S. PATENT DOCUMENTS

| | | | |
|---|---|---|---|
| 5,141,584 A | 8/1992 | Schuh et al. | |
| 5,169,474 A | 12/1992 | Binder | |
| 5,169,475 A | 12/1992 | Tobin | |
| 5,278,023 A | 1/1994 | Bills et al. | |
| 5,475,418 A | 12/1995 | Patel et al. | |
| 5,517,359 A | 5/1996 | Gelbart | |
| 5,520,776 A | 5/1996 | Van Allen et al. | |
| 5,521,035 A | 5/1996 | Wolk et al. | |
| 5,578,824 A | 11/1996 | Koguchi et al. | |
| 5,633,113 A | 5/1997 | Ellis | |
| 5,656,127 A | 8/1997 | De Niel et al. | |
| 5,695,907 A | 12/1997 | Chang | |
| 5,863,860 A | 1/1999 | Patel et al. | |
| 5,879,505 A | 3/1999 | Fujisawa et al. | |
| 5,935,758 A | 8/1999 | Patel et al. | |
| 6,242,140 B1 | 6/2001 | Kwon et al. | |
| 6,263,941 B1 | 7/2001 | Bryan et al. | |
| 6,294,308 B1 | 9/2001 | Caspar et al. | |
| 6,645,681 B2 | 11/2003 | Andrews et al. | |
| 6,682,862 B1 | 1/2004 | Chang et al. | |
| 6,899,988 B2 | 5/2005 | Kidnie et al. | |
| 6,921,614 B2 | 7/2005 | Andrews et al. | |
| 6,946,425 B2 | 9/2005 | Yamamoto et al. | |
| 7,148,957 B2 | 12/2006 | Tolbert et al. | |
| 2002/0160296 A1 | 10/2002 | Wolk et al. | |
| 2003/0113656 A1 | 6/2003 | Tyan et al. | |
| 2004/0115556 A1 | 6/2004 | Nakamura | |
| 2005/0123801 A1 | 6/2005 | Yang et al. | |
| 2006/0081332 A1 | 4/2006 | Kang et al. | |
| 2006/0082640 A1 | 4/2006 | Chin et al. | |
| 2006/0132589 A1 | 6/2006 | Kang et al. | |

*Primary Examiner*—Richard Schilling
(74) *Attorney, Agent, or Firm*—Thomas H. Magee

(57) ABSTRACT

In a method of using a donor element in a radiation-induced thermal transfer process, an assemblage is provided that includes a donor element and a receiver element, wherein the donor element has a support layer and a transfer layer having one side adjacent the support layer and the other side adjacent the receiver element. After image-wise exposing the assemblage to radiation whereby a portion of the transfer layer is transferred to the receiver element, relative movement between the support layer and the receiver element is provided before separating the donor element from the receiver element. Advantages include improved edge straightness, image width predictability, improved thermal mass transfer, and improved color filters.

17 Claims, 13 Drawing Sheets

METHOD OF SEPARATING AN EXPOSED THERMAL TRANSFER ASSEMBLAGE

BACKGROUND OF THE INVENTION

1. Field of the Invention

This invention pertains to a method of using a donor element in a radiation-induced thermal transfer process wherein an assemblage is provided that includes a donor element and a receiver element. The donor element has a support layer, and a transfer layer having one side adjacent the support layer and the other side adjacent the receiver element. The assemblage is then image-wise exposed to radiation whereby a portion of the transfer layer is transferred to the receiver element

2. Description of the Related Art

Imaging methods are most desirable when they produce images with sharp boundaries at the intended locations between exposed areas and unimaged areas. In radiation-induced thermal transfer imaging, especially laser-induced, boundaries between or separation of imaged and unimaged areas can be produced during or between the two steps of imaging and separation of an imageable assemblage of the donor element and the receiver element.

U.S. Pat. No. 5,935,758 "Laser induced film transfer system", to Imation Corp. by Patel et al., discloses a procedure for imagewise transfer of a material from a donor comprising an absorber to a receptor that involves assembling the two elements in intimate face-to-face contact, e.g., by vacuum hold down or alternatively by means of the cylindrical lens apparatus described in U.S. Pat. No. 5,475,418 and scanning by a suitable laser. The assembly may be imaged by any of the commonly used lasers, depending on the absorber used, but address by near infrared emitting lasers such as diode lasers and YAG lasers, is preferred.

Any of the known scanning devices may be used, e.g., flat-bed scanners, external drum scanners, or internal drum scanners. In these devices, the assembly to be imaged is secured to the drum or bed, e.g., by vacuum hold-down, and the laser beam is focused to a spot, e.g., of about 20 micrometers diameter, on the IR-absorbing layer of the donor-receptor assembly. This spot is scanned over the entire area to be imaged while the laser output is modulated in accordance with electronically stored image information. Two or more lasers may scan different areas of the donor receptor assembly simultaneously, and if necessary, the output of two or more lasers may be combined optically into a single spot of higher intensity. Laser address is normally from the donor side, but may be from the receptor side if the receptor is transparent to the laser radiation.

Peeling apart the donor and receptor reveals a monochrome image on the receptor. The process may be repeated one or more times using donor sheets of different colors to build a multicolor image on a common receptor.

U.S. Pat. No. 5,633,113, "MASS TRANSFER IMAGING MEDIA AND METHODS OF MAKING AND USING THE SAME", by Ernest W. Ellis to Polaroid Corporation, discloses an imaging assembly comprising a polyester enclosure or pouch having an open ended portion for receiving a donor and a receptor element. After the enclosure is loaded with the donor and receptor elements, a vacuum is drawn on both sides thereof in a vacuum chamber for evacuating the enclosure to force the donor and receptor elements into contact with each other. Once the enclosure is imaged under vacuum and opened the donor and receptor elements can be easily removed and separated since the two were held together by vacuum compression. Thereafter, the receptor can be subsequently processed such as by post-curing.

Another approach for joining the donor and receptor elements into an integral unit wherein a vacuum is maintained between the donor and receptor elements is to assemble both in a vacuum chamber, wherein they are placed in overlying face-to-face relationship with each other. After a vacuum is applied, any air existing at the interface between the donor and receptor elements will have been evacuated and the marginal edges can be sealed at to maintain the vacuum existing between the donor and receptor elements, by a suitable means, such as an adhesive layer on one or both of the mating surfaces being brought into contact with each other, as by the application of a pressure device. Following imaging the donor element, the donor/receptor elements can be separated, such as by breaking the adhesive bonding there between.

U.S. Pat. No. 6,294,308 "THERMAL IMAGING PROCESS AND PRODUCTS USING IMAGE RIGIDIFICATION" by Caspar et al. to E. I. du Pont de Nemours and Company, discloses that a laserable assemblage of a donor element that contains a thermally imageable layer, and a receiver element, is exposed imagewise so that the exposed areas of the thermally imageable layer are transferred to the receiver element in a pattern. The laser beam and the laserable assemblage are in constant motion with respect to each other, such that each minute area of the assemblage is individually addressed by the laser as necessary. This is generally accomplished by mounting the laserable assemblage on a rotatable drum. A flat bed recorder can also be used.

The next step in the process is separating the donor element from the receiver element. Usually this is done by simply peeling the two elements apart. This generally requires very little peel force, and is accomplished by simply separating the donor support from the receiver element. This can be done using any conventional separation technique and can be manual or automatic without operator intervention.

Separation results in a laser generated image, comprising the transferred exposed areas of the thermally imageable layer, being revealed on the receiver element.

U.S. 20050158652 "THERMAL IMAGING PROCESS AND PRODUCTS MADE THEREFROM", by Jon Caspar discloses a specific method of separating an imaged laserable assemblage into a spent donor element and a receiver element, by peeling the donor element away from the nearly immobile receiver element. Peeling can be done manually, or by manipulating the donor element over a guide. A specific guide that can be used is a rod. Any direction of peeling can be used.

U.S. Pat. No. 5,578,824 by Koguchi et al. to Fuji Film Company Ltd. discloses a donor sheet having a support supporting a thin and peelable film adhered to a image-receiving material with a uniform adhesive force under heat and/or pressure that is applied by laminating means. Thermal energy is applied imagewise (e.g. by a laser) to cause imagewise reduction in the bonding force of the thin film in the donor sheet, so that the force of bond between the thin film in the donor sheet and the support becomes smaller than the force of adhesion between the thin film in the donor sheet and the image-receiving material. The donor sheet is peeled from the image-receiving material by peel/transfer means without causing uneven peeling, and the thin film which has experienced the imagewise reduction in the binding force is transferred from the donor sheet onto the image-receiving material, effecting transfer to form an image of thin-film.

The image-receiving material can be peeled from the donor sheet with pressure being applied by a pressing means such as peel rollers, whereby the non-heated area of the thin film is peeled from the image-receiving material without causing unevenness while, at the same time, the heated area of the thin film is transferred onto the image-receiving material, thereby forming an image on the latter.

The donor sheet that has a latent image formed upon exposure to an exposing head in a heating mode is peeled from the image-receiving material by a mechanism while, at the same time, the latent image on the donor sheet is developed as it is peeled by this mechanism and transferred onto the image-receiving material. The peeling mechanism can comprise a peel roller, two segmented rollers and that contact the peel roller, comb-toothed guide plates each of which is provided between segments of the rollers and along the peel roller, and a bracket in which these parts are mounted as a unitary assembly. The peel roller is axially supported by an arm and pivots about a fulcrum so that it can approach or depart from a drum holding the image-receiving material. The peel roller is also provided, via the arm, with pressing means for pressing the laminate of the image-receiving material and the donor sheet as it is carried on the drum.

The donor sheet which has a latent image formed thereon in response to the decrease in the bonding force of the thin layer as a result of the imagewise application of thermal energy due to exposure in a heating mode forms a laminate with the image-receiving material the donor sheet bonded thereto. When the arm pivots about the fulcrum so that the bracket approaches the laminate and the comb-toothed guide plates are inserted between the image-receiving layer in the image-receiving material and the thin layer in the donor sheet; at the same time, the laminate is compressed with the peel roller which is pressed against the donor sheet. If the joining length of either one of the donor sheet and the image-receiving material is made different from that of the other, the comb-toothed guide plates can be easily inserted between the two sheets. Thereafter, the drum is rotated while, at the same time, the peel roller, segmented rollers are also rotated so that the leading end of the donor sheet is moved along the comb-toothed guide plates to be held between the peel roller and each of the segmented rollers. Thus, the donor sheet is compressed with the peel roller as it is held for transport between the peel roller and each of the segmented rollers, whereby it is peeled from the image-receiving material. Thus, the donor sheet can be peeled at a constant speed in the area where it is compressed with the peel roller; as a result, the peeling force can be maintained at a constant level and neither vibrations such as "stick slip" nor uneven peel will occur. As a further advantage, the peeling force that is exerted upon the image-receiving material will not vary during the peeling operation and, hence, there will be no offset in the position where the image-receiving material is secured onto the drum, nor will there be the possibility of lower precision in registration. Thus, one can produce a monochromatic halftone image that is high in quality, resolution and contrast and which yet is free from defects such as uneven peel and failure in registration.

U.S. Pat. No. 5,695,907 "LASER ADDRESSABLE THERMAL TRANSFER IMAGING ELEMENT AND METHOD" by Jeffrey C. Chang to Minnesota Mining and Manufacturing Company discloses an imaging system including: (i) a thermal color transfer element comprising a substrate having deposited thereon in the following order; (a) a light-to-heat conversion layer; (b) a color transfer layer; and (c) a thermally transferable infrared sensitive adhesive topcoat comprising an infrared absorber and a thermoplastic material; and (ii) a receptor in intimate contact with the adhesive topcoat of the thermal transfer element.

After laser imaging the system to produce parallel but separate line images using a laser-induced thermal transfer method and separation of the receptor from the thermal color transfer element, under 200 times power microscopic examination, the resultant image on the receptor had a line width of 105 microns and a sharp line edge having no signs of fragmented patterns on either side of the imaged lines.

United States Patent Application 2006/0081332 by Tae-Min Kang, et al., titled "Laser induced thermal imaging (LITI) apparatus" discloses a laser induced thermal imaging (LITI) apparatus, a laminator, and an LITI method using the apparatus comprising: arranging a lower substrate on a chuck; arranging an upper substrate including at least a Light-to-Heat Conversion (LTHC) layer and a transfer layer such that the transfer layer faces the lower substrate; closely adhering the upper substrate to the lower substrate by raising an air pressure in a space above the upper substrate to a pressure higher than an air pressure in a space below the upper substrate; and transferring at least one portion of the transfer layer onto the lower substrate by irradiating a laser beam on the upper substrate adhered to the lower substrate. A related method further comprises providing the chuck with at least one second lower ventilation hole arranged around the lower substrate, and detaching the upper substrate from the lower substrate by injecting a compressed gas through the second lower ventilation hole after transferring the transfer layer.

U.S. Pat. No. 6,242,140 by Jang-hyuk Kwon, et al. (Jun. 5, 2001) to Samsung SDI discloses a method for manufacturing a color filter by thermal transfer using a laser beam with uniform energy distribution. The method includes forming a black matrix pattern on a substrate by photolithography.

U.S. Pat. No. 6,682,862 by Chang, et al., assigned to LG. Philips LCD Co., Ltd., titled "Method of fabricating color filter substrate for liquid crystal display device" discloses a method of fabricating a color filter substrate for a liquid crystal display device. The thermal mass transfer method includes the steps of forming a black matrix on a substrate; adhering a color transcription film to the substrate; disposing a laser head over the color transcription film; repeatedly scanning the color transcription film; and removing the color transcription film so that a color filter pattern remains in color filter pattern regions defined inside the black matrix. End lines for each one of the repeated scans are located on the black matrix.

Laser-induced mass transfer processes have the advantage of very short heating times compared to thermal printhead processes. However, the resulting images generated in the laser-induced systems can be fragmented, imperfectly resolved, of unpredictable width, or can have rough line edges. Therefore, there is a need for a thermal transfer system that takes advantage of the speed and efficiency of radiation, particularly laser, addressable systems without sacrificing image quality, resolution or line edge fidelity, without the need for special donor elements or receiver elements.

SUMMARY OF THE INVENTION

The invention is a method of using a donor element in a radiation-induced thermal transfer process to form an image, the method including providing an assemblage of a donor element and a receiver element, wherein the donor element includes a support layer and a transfer layer having one side adjacent the support layer and the other side adjacent the receiver element. The assemblage is image-wise exposed to radiation whereby a portion of the transfer layer is transferred to the receiver element to form a transferred layer. The donor element is then separated from the receiver element, thereby revealing the image on the receiver element, but also performing an intermediate step of treating the assemblage after the exposing step and before the separating step by providing relative movement between the support layer and the receiver element.

The relative movement appears to affect connectors between the transfer layer remaining on the exposed donor element and the transfer layer transferred to the receiver element, so that when the (spent) donor element and (imaged) receiver element are separated, the connectors remain mainly on one or the other element, and are not fragmented.

A preferred movement is a shearing type movement between the receiver element surface and the donor element surface. A roller, a braked roller, or a driven roller, can be used advantageously to impart the treating movement.

The invention also includes use of these and related methods to make useful objects such as spent donor elements, imaged receiver elements, color filters, and proofs.

DETAILED DESCRIPTION OF THE PREFERRED EMBODIMENT(S)

Figure 1:
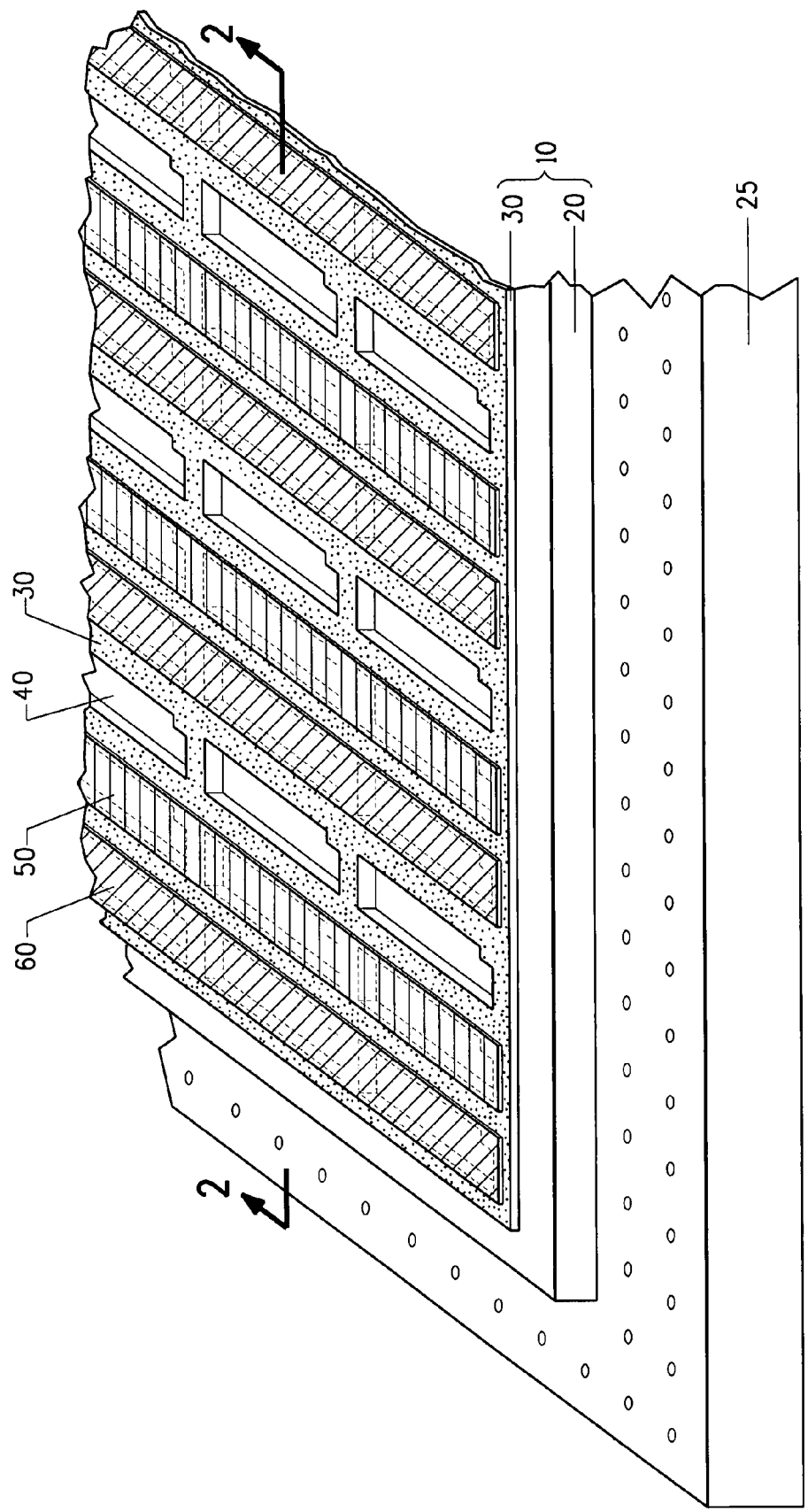
FIG. 1 is an elevated view of a receiver element on a vacuum table. The receiver is a glass sheet bearing a color filter black matrix defining pixels, one third of which pixels are covered by a blue color filter transfer layer, and one third of which pixels are covered by a red color filter transfer layer.

In the following invention, a new treating step is added to the well-known steps of exposing and separating an assemblage used in a radiation-induced thermal transfer process. The treating step acts to regularize the breaking of connectors of transfer layer material between unexposed transfer layer and exposed transferred layer in comparison to the breaking that occurs during known methods of separating. In one embodiment, straight image edges and predictable image width are achieved by breaking connectors close to exposed transferred layer.

In one embodiment of the invention, connectors composed of transfer layer material, located between and connected to both transferred layer on a receiver element due to exposure of an assemblage to radiation, and to transfer layer remaining on a donor element with a support layer of the assemblage after the exposure, are broken, fragmented, cleaved, sheared, separated, or otherwise altered at a location close to the transferred layer on the receiver element so that upon separation of the donor element from the receiver element a majority by volume of the connector is retained with the donor element.

In one embodiment, this treatment is carried out by means of a parallel movement of the support layer relative to the receiver element. In one embodiment, this treatment is carried out by means of a movement of the support layer away from the receiver element. In one embodiment, this treatment is carried out by means of a movement of the support layer towards the receiver element. In one embodiment, the treating step is performed by moving the position of the support layer a first distance from a first position to a second position relative to the receiver element along a direction substantially parallel to the support layer, followed by a restoring movement of the support layer to a third position at a second distance from first position, the second distance shorter than the first distance. In another embodiment, the treating step is performed by moving the position of the support layer from a first position to a second position relative to the receiver element along a direction away from the receiver element, followed by moving the position of the support layer from the second position to a third position relative to the receiver element along a direction towards the receiver element. In another embodiment, the treating step is performed by moving the position of the support layer from a first position to a second position relative to the receiver element along a direction towards the receiver element, followed by moving the position of the support layer from the second position to a third position relative to the receiver element along a direction away from the receiver element.

In one embodiment of the following methods made up of steps, it should be understood that steps are discrete and independent. The time between steps can be minutes or longer, but for the sake of convenience is typically seconds or less, for example at least 20, 10, 5, 2, 1, 0.5, 0.1, 0.05, 0.01, or 0.001 seconds. The elapsed time for each step at a discrete location can be quite short; for example, irradiation with a laser having a 10 micron beam length moving at 2 meters per second gives a laser illumination time of a point of 0.000 005 seconds in the exposing step. Each step can be carried out over the entire assemblage at one time, such as by a bank of lasers to accomplish exposing at each location at one time, or over portions of the assemblage at different times, as by a moving laser head for exposing or a roller for treating or separating. The duration of each step can be long or short. For example, the time of contact with a means of separation (such as a roller wrapping up the donor element in order to remove it from the receiver element, that could be moving at 1 meter per second and contact the assemblage for a 1 cm length) could achieve a separation time at a given point of about 0.01 seconds between starting the separation step and completing the separation step at a given location. On the other hand, it would take about 1 second to separate an entire assemblage of about a square meter.

Thermal transfer imaging by exposing of an assemblage of a donor element (comprising at least a support layer and a transfer layer) and a receiver element can form connectors of transfer layer. The connectors stretch between unexposed transfer layer associated with, and in contact with, the donor element, and exposed transferred layer associated with, and in contact with, the receiver element. The connector portion of transfer layer has opposite surfaces, neither of which is in adjacent direct contact with any of the donor element surfaces or any of the receiver element surfaces.

The connector surface closest to the receiver element was previously the outermost layer of the transfer layer away from the support layer, and will be termed the receiver-side surface. The connector surface farthest from the receiver element is the surface formed by the separation of the transfer layer from the donor element as a result of the exposure to radiation (exposing or imaging), and will be termed the donor-side surface.

The donor-side surface of the connector can face an untransferred portion of transfer layer on the donor element, or the donor element may have no transfer layer present at that location on the donor element due to a complete transfer by the exposing step. This situation is analogous to that of the transferred layer, that may be formed from transfer layer where the entire thickness of transfer layer has completely separated from the donor element (adhesive type failure), or may be formed from transfer layer that has partially separated from the donor element (cohesive type failure), leaving behind a residue of transfer layer or related material (such as transfer layer altered by the heat of the exposing step) that is not necessarily contacting the transferred layer.

Since these connectors and their effect on image quality are seldom made note of in the known art, a discussion of the formation and breaking of these connectors is appropriate with respect to methods in the known art and the figures.

One illustrative comparative embodiment of a conventional laser-induced thermal transfer method is the manufacture of a portion of a three color (blue, green, and red) filter suitable for a conventional liquid crystal display. The addition of a third set of color filters onto the color filter, namely green color filters, is described below. The green filters are added to pixels on a glass receiver element, which already has red and blue color filters on adjacent pixels due to a previous thermal transfer imaging with a blue donor element and a red donor element. A single set of pixels awaits addition of the green transfer layer. This thermal transfer method can use a flat vacuum table (25) holding a receiver element (10), the color filter with red and blue and uncolored pixels, as in FIG. 1. In this illustration as in those following, vertical and horizontal measurements are not always illustrated to scale, in order to aid comprehension, since they are in certain cases greatly different and would be inconvenient to draw to scale. Typical illustrative dimensions are given in the text, without limiting the applicability of the claims to other feasible dimensions.

FIG. 1 shows a receiver element (10) comprising a flat glass support layer (20), e.g. 700 microns thick, 920 mm long, and 730 mm wide, resting on and held rigid and level by a vacuum table (25), with the four edges of the flat glass support layer falling well inside the evacuated flat horizontal portion of the vacuum table, in order to allow the vacuum table to act upon both the receiver element and the donor element introduced later. Other receiver sizes and vacuum table sizes can of course be used. On the opposite side of the glass support layer from the vacuum table there is a color filter organic black matrix (30) approximately one micron thick defining transparent windows (40) where the black matrix is absent. The roughly rectangular windows, arranged to have three per each addressable full color square area in the final liquid crystal display, are for example transparent regions of glass surface approximately 144 microns wide and 492 microns long delineated by portions of the black matrix that are approximately 30 microns wide. An approximately square notch of black matrix intrudes on each window to later accommodate a thin film transistor of a liquid crystal display, making each window basically a six-sided figure. Ultimately, each approximately 522 micron squared area of the display will comprise a single red, green, and blue color filter window inside a full color cell. Each cell is capable of appearing nearly any color, gray, black, or white at a convenient viewing distance by filtering white light of separately controlled intensity supplied to each window of the cell into red, green, or blue light respectively. The final color filter can be incorporated into a display, for example a liquid crystal display, which provides the white light of varying intensity to each window by well-known techniques, for example involving attenuating polarized light by rotation of aligned liquid crystals. The glass of this dimension (sometimes termed Generation 4.5 glass) can accommodate two color filters, each with 1366 by 768 addressable full color areas of 522 microns width and length, each area having a blue window, a red window, and a green window.

The receiver element of FIG. 1 already bears blue color filter windows and red color filter windows due to previous thermal transfer imaging. For example, one column of windows (c) has a pattern of blue color filter stripes (50, being horizontally hatched) already covering the windows, namely each third column of windows beginning with the leftmost but one, arranged column-wise adjacently in a line with short edges abutted and long edges adjacent another column. The blue color filter stripes pass entirely over the black matrix defining the square notches for the thin film transistors, and entirely over the black matrix separating the top and bottom short sides of the windows in the column. The blue color filter stripes partially overlap the black matrix defining the long edges of the windows so as to account for manufacturing uncertainties in placement of the blue color filter stripes and leave room for overlap by an adjacent, non-blue stripe. Each blue color filter stripe is approximately 2 microns thick and approximately 154 microns wide and approximately as long as the black matrix itself in the column-wise direction, ca. 401 mm. The width of 154 microns accounts for coverage of the 144 micron wide glass window unobstructed by black matrix, and coverage of a 5 micron wide strip of black matrix on each long edge. Each blue stripe over a column of windows is adjacent a similar red stripe (60, with angled hatching) over a neighboring column of windows on one long side towards the left, and adjacent a column-wise line of windows on the other long side not yet having color filter functionalization on the right. Both the long edges and the short edges of the rectangular blue stripes and the red stripes are preferably located on the black matrix; and preferably do not overlap one another.

Figure 2:
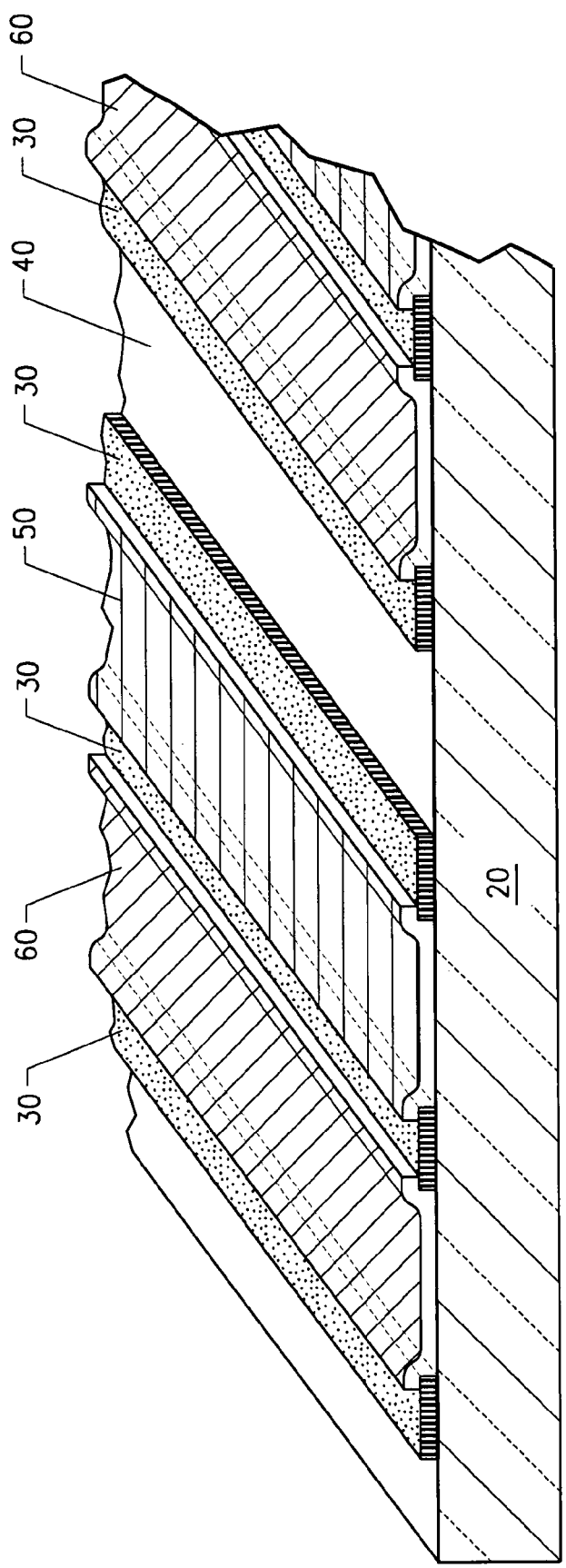
FIG. 2 is a cross-sectional view through columns of the receiver element of FIG. 1.

FIG. 2 shows an enlargement of a cut-away section of a part of the receiver element of FIG. 1 at cutaway location 2. FIG. 2 illustrates the relationship between the glass support layer (20) nearby and supporting the black matrix (30), the receiver element having a pattern of stripes of blue color filter transfer layer (50) that cover parts of the black matrix and a set of windows defined by those parts of the glass where the black matrix is absent. On the left is an adjacent pattern of stripes of red color filter transfer layer (60) that cover parts of the black matrix and a set of windows defined by those parts of the glass where the black matrix is absent. Adjacent on the right on the opposite side is a set of windows defined by those parts of the glass where black matrix is absent and green transferred layer is to be added (40). These figures are illustrative; relative dimensions vary greatly among the illustrated features (e.g. 700 micron thick glass, 1 micron thick black matrix, 2 micron thick blue color filter layer, 154 micron wide windows, 30 micron wide black matrix coverage 1.2 microns thick, etc.) and scale is not faithfully preserved in the figures. A suitable receiver element of the type shown in FIGS. 1 and 2 is one used for color filter manufacture. One example comprises a glass piece termed Generation 4.5 in size, 730 mm wide and 920 mm long and 0.7 mm thick. This glass can accommodate two LCD TV display color filters termed "32 inch", each formatted in a WXGA arrangement of 1366 horizontal and 768 vertical color elements, which can accommodate a "16 by 9" display of 1360 by 765 color elements. With square color elements of 522 microns on each side, the WXGA diagonal length is over 818 mm or 32.2 inches; the width is over 713 mm and the length is over 400 mm. Two display lengths are accommodated by the glass length of 920 mm with room to spare between, above, and below. Each single color window is 174 by 522 microns with a black mask approximately 30 microns wide defining windows approximately 144 microns wide and 492 microns long (excepting the small thin film transistor cutout).

In one embodiment, the color filter stripes already on the receiver element are approximately 401 mm in length, and the subsequent exposing step places the third and last sets of stripes of green color filter transfer layer material 401 mm in length on each separate black matrix.

Figure 3:
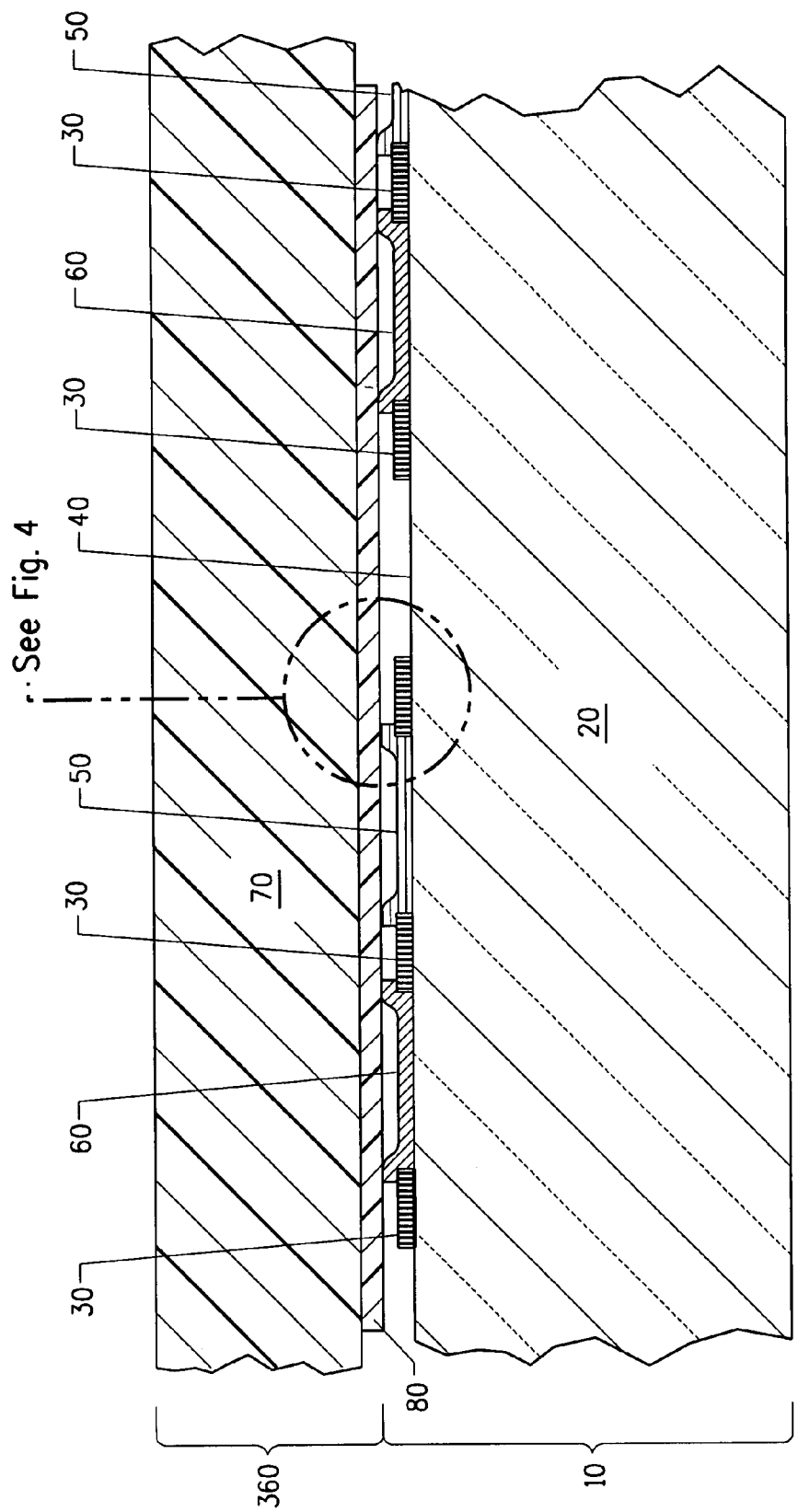
FIG. 3 is a cross-sectional view of a portion of an assemblage of the receiver element of FIGS. 1 and 2, and a donor element having a green color filter thermal transfer layer.

FIG. 3 illustrates an assemblage of a donor element (360) on the receiver element (10) to provide an assemblage suitable for imaging. The receiver element flat glass support (20), black matrix (30), blue color filter stripes (50), and red color stripes (60) are covered by the donor element. The donor element is larger in length and width than the receiver element and thus overlaps and contacts parts of the vacuum table completely surrounding the receiver element. The donor element in this figure comprises (a) a 50 micron thick polyethylene terephthalate film support layer (70) bearing adjacently (b) a 2 micron thick transfer layer (80) comprising a binder polymer, a green pigment, and an infrared absorbing dye. The transfer layer is situated between the donor element support layer and receiver element-contacting at least some area of the blue stripes and the red stripes and the vacuum table around the receiver element, and optionally the black matrix where not covered by blue stripes or red stripes, and optionally the glass. In this alignment with the donor element more than covering the receiver element, the vacuum table evacuates the air within the space between the receiver element and the donor element, and air pressure on the polyethylene terephthalate film support layer of the donor pushes down the donor element onto the receiver element and generally holds the donor element and the receiver element in a fixed position of contact. The relative position could be altered by a force, but is resistant to realignment. In one embodiment, the donor element is suspended above the black matrix and the glass support layer in many or most areas, while contacting the blue color filter layer and the red color filter layer, due to the rigidity of the polyethylene terephthalate film, the relatively short distance between the blue color filter layer stripes and the red color filter layer stripes, and the height of the color filter layers and black matrix layer, as illustrated in FIG. 3.

Figure 4:
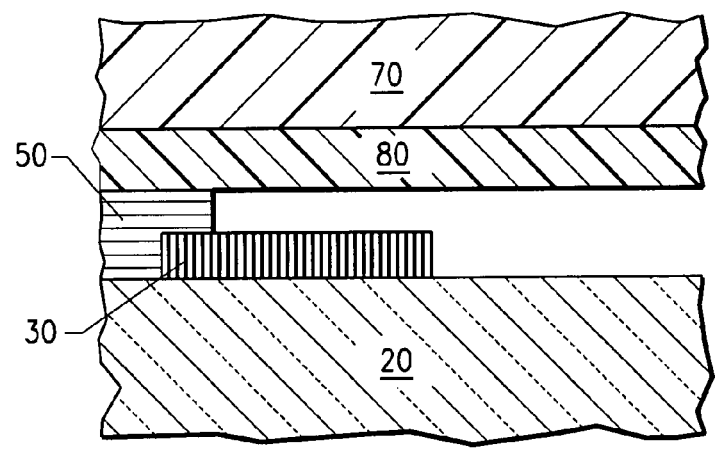
FIG. 4 is a cross-sectional view of FIG. 3, showing the region surrounding a portion of the black matrix partially covered by the blue color filter transfer layer adjacent to the area to be imaged to provide a green color filter transfer layer on the receiver element on a pixel defined by the black matrix, and on a portion of the black matrix.

FIG. 4 shows an embodiment where, although the green transfer layer (80) associated with the donor element of the assemblage contacts the blue transfer layer (50) of the receiver element where the blue transfer layer is on the black matrix (30), the green transfer layer is suspended above and not in contact with the black matrix itself due to the rigidity of the polyethylene terephthalate support layer and the elevating spacing provided by the neighboring stripes of red and blue transfer layer. The green transfer layer is also suspended above, and not in contact with, the glass (20) where the black matrix (30) defines the transparent windows.

In the one comparative embodiment, the assemblage held on the vacuum table is selectively exposed to radiation by illumination of the donor element with a rapidly scanned infrared laser to introduce on the receiver element a pattern of 768 green stripes of transfer layer each 154 microns wide, each edge on the black matrix, one long edge adjacent a blue stripe and one side adjacent a red strip.

Figure 5A:
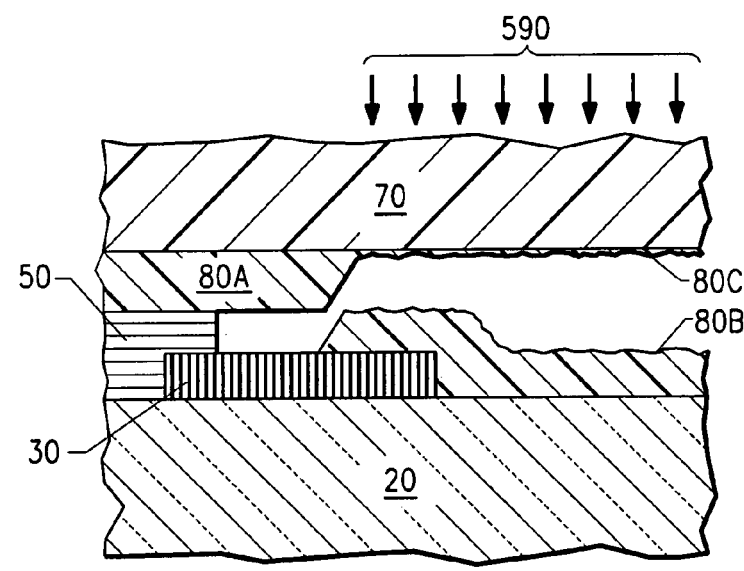
FIGS. 5A and 5B are cross-sectional views of the assemblage of FIG. 4 after exposing.

FIG. 5A shows one possible outcome of the exposing of the green donor element near the blue stripe: the transfer layer corresponding to the image (80B) can break away from the unexposed transfer layer (80A), making the transferred layer associated with the receiver element separate from the transfer layer on the donor element as a consequence of the exposing. This result of exposing in the region of the black matrix where the blue transfer layer (50) on the black matrix (30) abuts the area of illumination of the donor element to transfer the green transfer layer is shown in FIG. 5A. A residue of incompletely transferred green transfer layer (80C) remains in the exposed areas.

An infrared laser can be used to illuminate the donor element on the support layer (590) at the right of the figure to transfer green transfer layer (80), leaving a portion of untransferred unexposed transfer layer (80A) on the left, a portion of transferred layer (80B) on the right, and in this case incompletely transferred transfer layer (80C) remaining on the donor element after the exposing. A clean separation is made between transferred layer on the receiver element and untransferred and incompletely transferred transfer layer on the donor element; the transferred and untransferred transfer layers are not connected by transfer layer material.

Figure 5B:
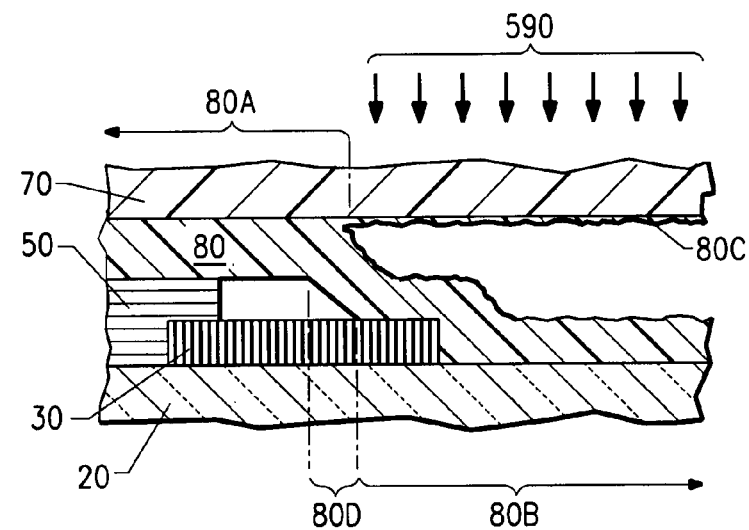

FIG. 5B shows another possible outcome of exposing the assemblage over the same area (590). The illumination by a laser through the donor element support layer over an area (590) produces green transfer layer movement to the receiver element to give a transferred layer (80B), and in a transition region between or nearby the exposed and non-exposed areas, separation of the transfer layer from the donor element and elongation (but not breaking) of the green transfer layer accompanies the movement to form a connector (80D) of transfer layer material. The connector of transfer layer connects the transferred layer that is contacting the receiver element to the untransferred transfer layer that is contacting the donor element. The result of exposing is that green transferred layer (80B) is contacting and associated with the black matrix and glass and no longer associated with the donor element except through the connector. The intended lack of effective laser illumination over areas where the image is not to appear leaves the green transfer layer (80A) basically undisturbed, remaining in contact and associated with the donor element, and not in contact with the black matrix or glass. In FIG. 5B in the transition region between area 80A and area 80B, namely area 80D, the contact of most of the thickness of the green transfer layer with the donor element is lost, but the green transfer layer is not moved into contact with the receiver element. The green transfer layer in area D (80D) forms a connector between the unchanged green transfer layer (80A) associated with the donor element, and the green transfer layer (80B) associated with the image on the receiver element.

In one embodiment, after such selective exposing, the force maintaining the assemblage intact, e.g. the vacuum of the vacuum table, is left on and thus the force maintaining the donor element and the receiver element in contact with one another is undiminished. This force keeping the assemblage intact in one embodiment can be maintained throughout the treating step and for a period of time after the treating step and even in part during the separation step.

In another comparative embodiment, after such selective exposing, the vacuum of the vacuum table is turned off and the atmospheric pressure between the receiver element and the donor element is allowed to rise to ambient pressure. Since the air pressure between the donor element and the receiver element becomes the same as the air pressure on the opposite side of the donor element, the donor element is relatively easily removed from the receiver element to disassemble the exposed assemblage. The imaged receiver element includes a RGB color filter suitable for a liquid crystal display.

The separation of the donor element from the receiver element in the assemblage after exposing provides a spent donor element and an imaged receiver element. Separation is a well-known step applied to a thermal transfer assemblage after exposing.

The separation can break the connectors of green transfer layer between the two elements that are shown in FIG. 5B. Some possible modes of breakage or separation of the connectors, at the connector and remotely to the connector, are shown in FIG. 6 when the separation has proceeded only a very small amount. In the case where a noticeable portion of the connector is attached to either the donor element or the receiver element, we will refer to that noticeable portion as a flap.

Figure 6A:
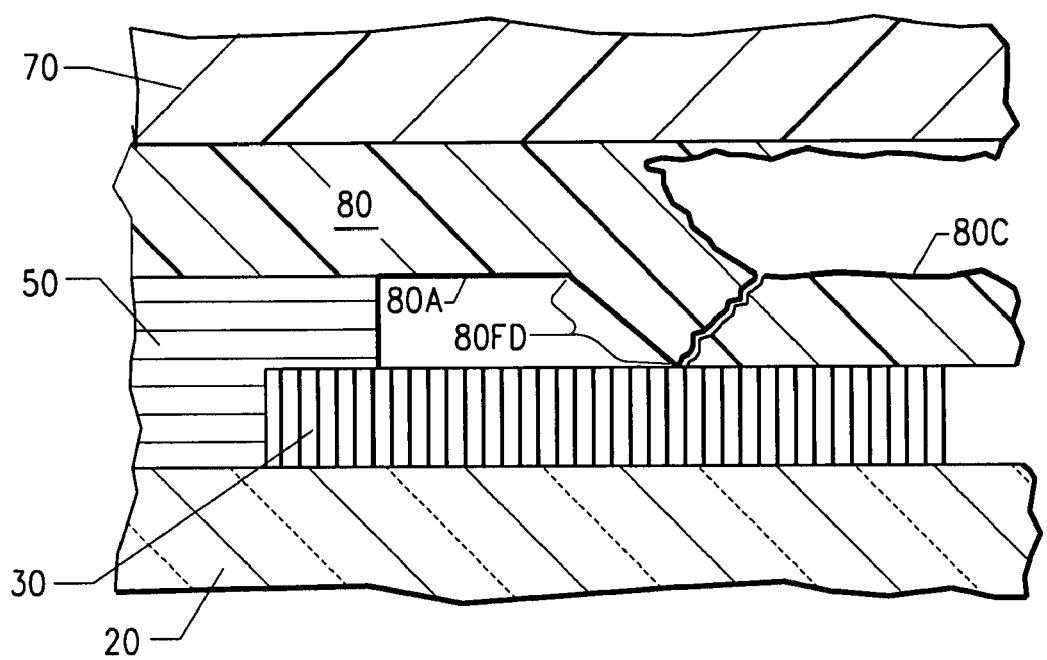
FIGS. 6A through 6F are cross-sectional views of possible separation modes of the assemblage of FIG. 5B.
Figure 6B:
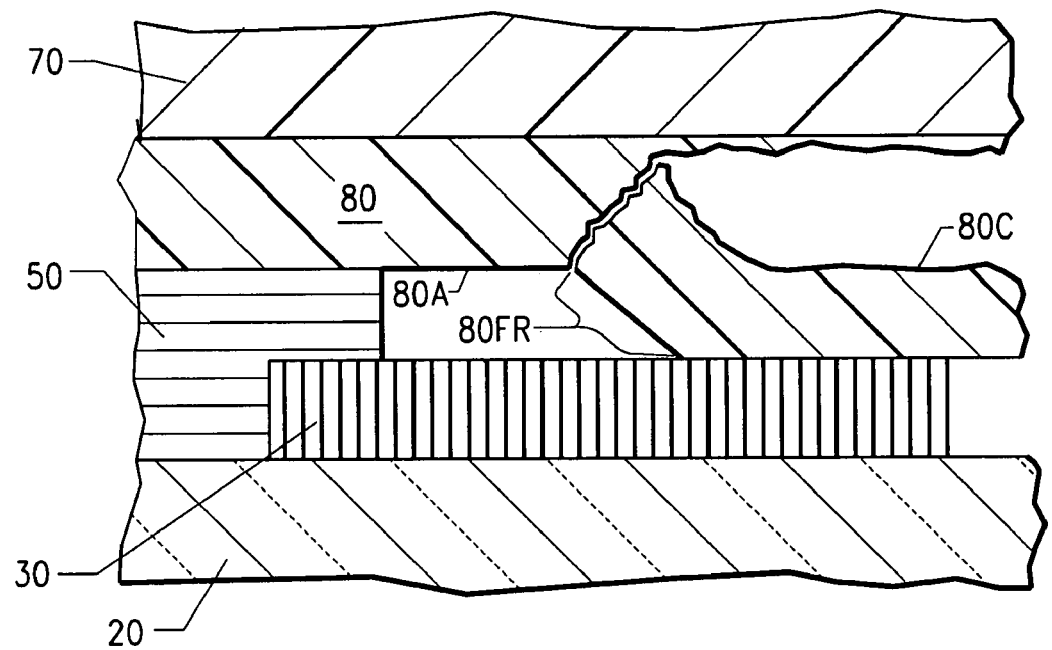
Figure 6C:
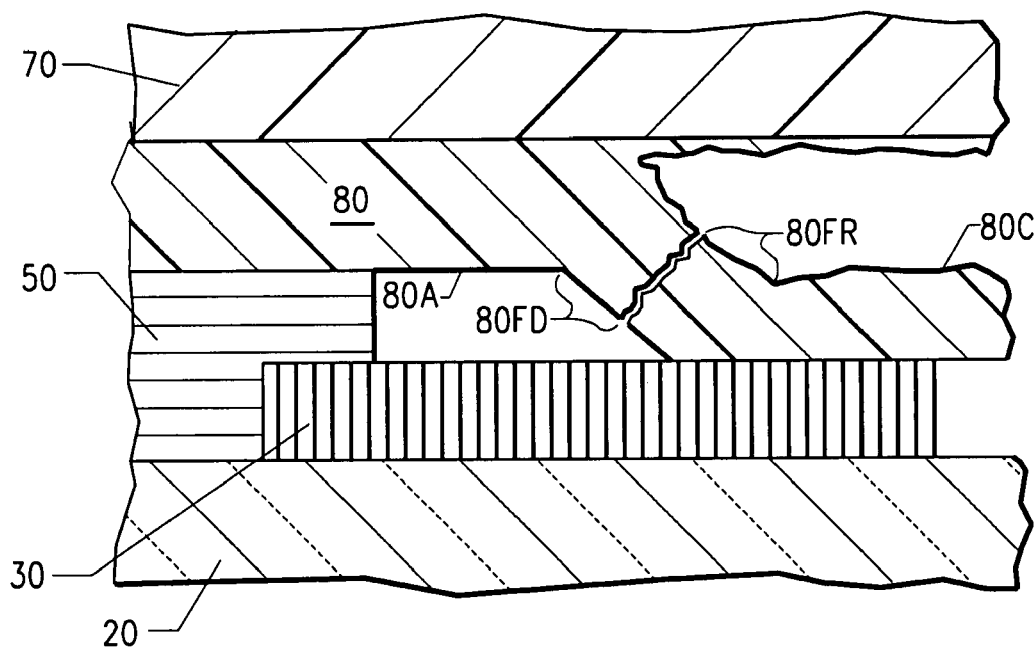
Figure 6D:
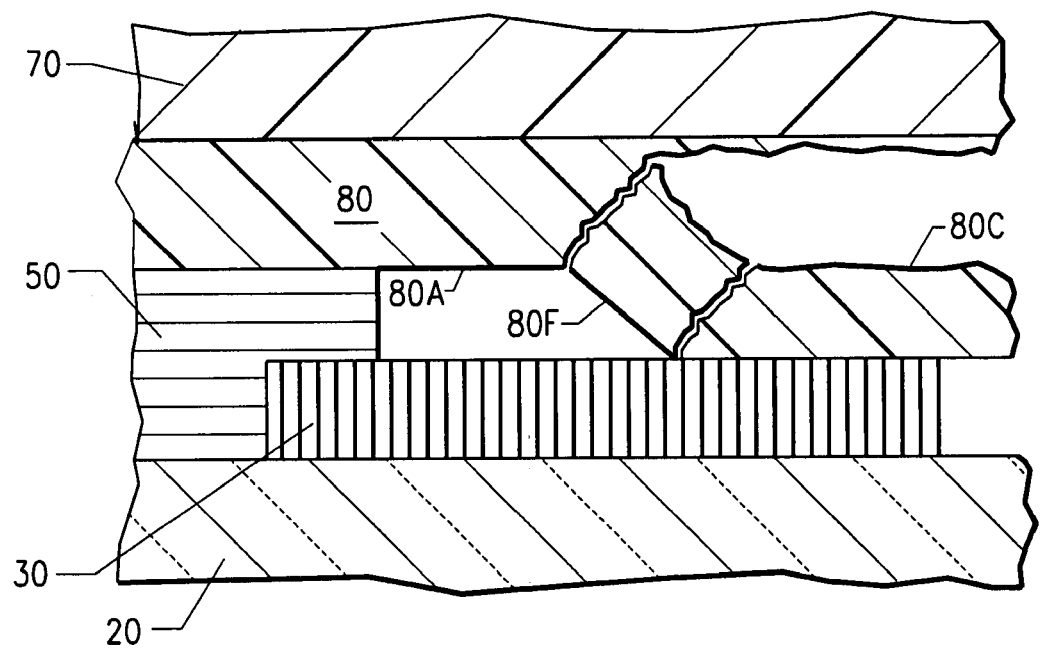

In FIG. 6A, a single break occurs close to the green transferred layer (80C) associated with the receiver element, and a flap of transfer layer material (80FD) remains attached to the green transfer layer (80A) associated with the donor element (a donor element flap). In FIG. 6B, a single break occurs close to the green transfer layer (80A) associated with the spent donor element, and the connector segment of transfer layer (80FR) remains attached to the green transfer layer (80C) associated with the receiver element (a receiver element flap). Other locations for a single break, and the possibility of multiple breaks, are possible. In FIG. 6C, a single break occurred so that separate portions of the connector of transfer layer remains connected to both of the transfer layer on the spent donor element (80FD) and the transfer layer on the imaged receiver element (80FR). In the case of multiple breaks in the connector of green transfer layer shown in FIG. 6D, it is possible for a fragment (80F) of green transfer layer to form and later fall onto the receiver element, or become attached to either donor element or receiver element by electrostatic forces.

Figure 6E:
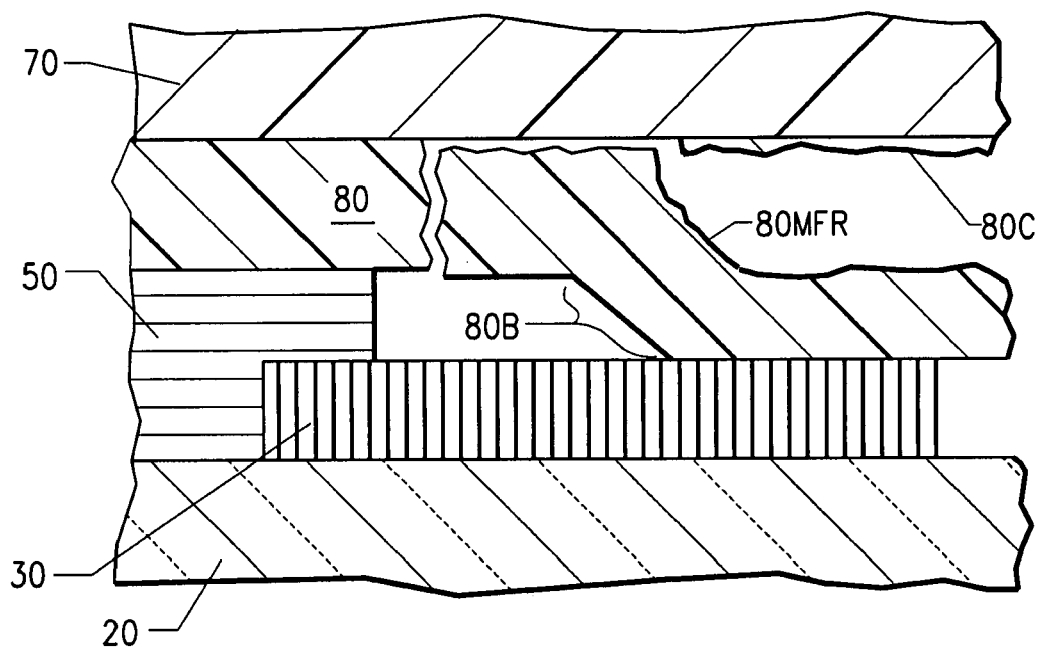
Figure 6F:
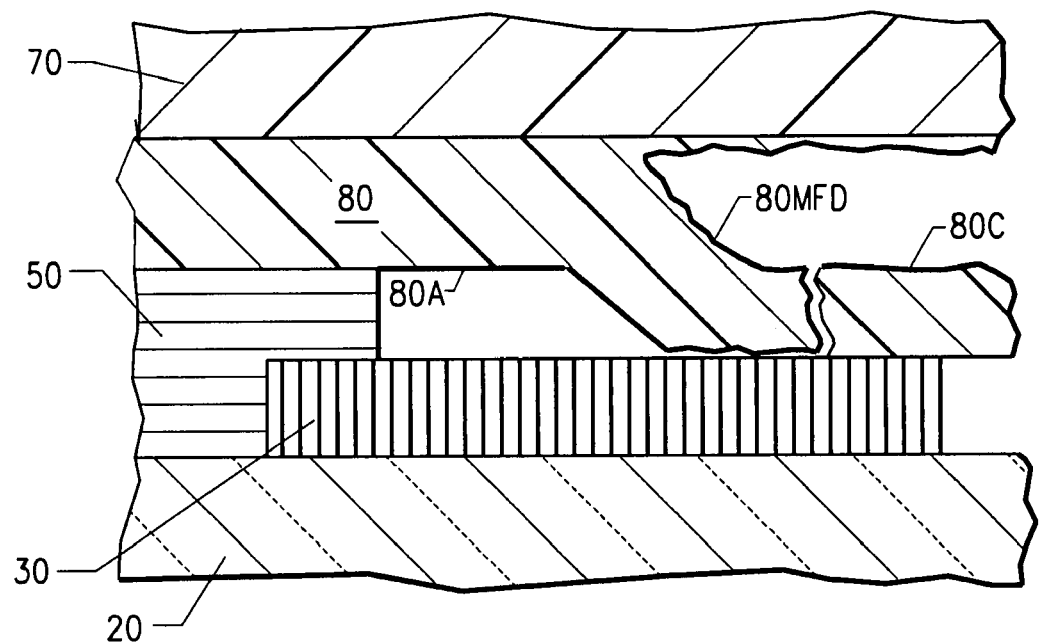

FIG. 6E illustrates an undesirable condition where a break in the green transfer layer occurs within the unexposed area of transfer layer that was associated with the donor element and typically was not meant to be a part of the image on the receiver element. By delamination in the area 80A', some green transfer layer in an unexposed area can lose its association by contact with the donor element, and become associated with the receiver element by the connection through the unbroken connector of green transfer layer (80B), making a megaflap larger than the flap possible from the original connector (a receiver element megaflap). An analogous mode of breakage in the imaged area of green transfer layer, shown in FIG. 6F, can leave some of the green transfer layer in an exposed area that was associated with the receiver element by exposing, connected with the separated spent donor element through the unbroken connector of green transfer layer in a donor element megaflap (80MFD).

Separation of the assemblage of FIG. 5A with no connector between the already separated green transfer layer associated with the spent donor element and already separated green transfer layer associated with the imaged receiver element can be expected to proceed without any change in the amount of green transfer element associated with each element, and no flap formation.

Figure 7:
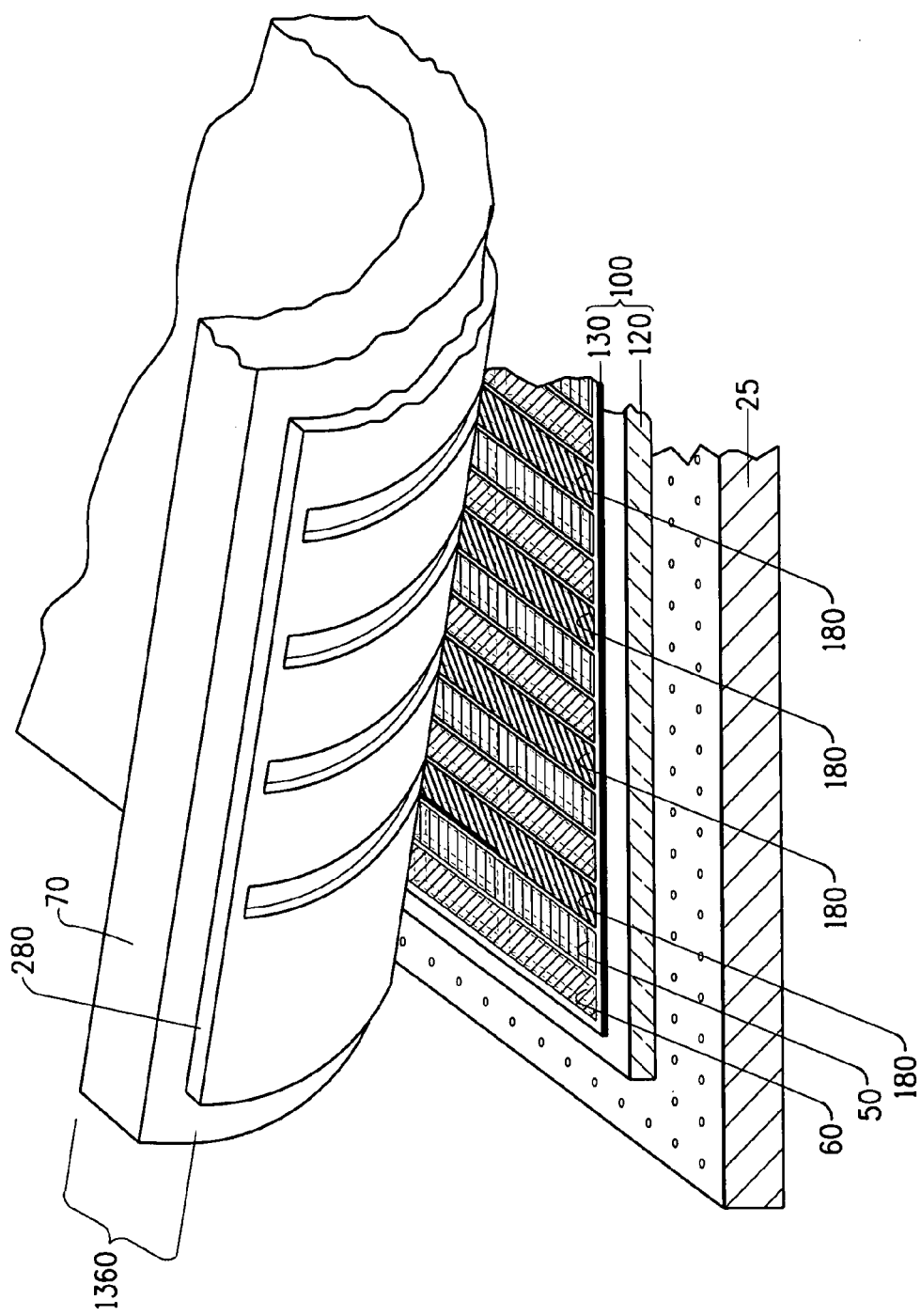
FIG. 7 is an elevated view of peeling a spent green transfer layer donor element away from a green imaged receiver element.

FIG. 7 illustrates one embodiment of a process of separating the exposed assemblage into a spent donor element and an imaged receiver element. FIG. 7 shows a peeling process wherein the donor element is being peeled from the imaged receiver element from front or bottom to the back or top. At the front of FIG. 7, the uncovered imaged receiver element (100) (equivalent to the previous receiver element 10 plus the added green stripes) includes columns of windows separately covered by red transfer layer (60), blue transfer layer (50), and green transfer layer (180). Above the uncovered imaged receiver element is the corresponding portion of separated spent green transfer layer donor element (1360), comprising the support layer (70) and spent green transfer layer (280), missing the portions of green transfer layer that form the filters on the imaged receiver element. The imaged receiver element remains on the operating vacuum table (25) which serves to hold the imaged receiver element fixed in position. At an interface where the donor element just contacts the receiver element, separation occurs. At that interface, the vacuum created by the vacuum table between the donor element and the receiver element is replaced by the ambient atmospheric pressure. Some infiltration of the ambient atmosphere into the unseparated portions of the assemblage can be expected.

Previously known methods of exposing and separating an assemblage can lead to formation of connectors and the breakage of connectors in a variety of the modes illustrated in FIG. 6 at different locations of the edges of an image formed on a receiver element. The presence or absence of flaps, and the variable size of flaps, and the presence of fragments on both the spent donor element and the imaged receiver element, is a source of unpredictable variability in image size and edge quality that causes a poor quality image. Separation without treatment can give line edges that are rough, being a combination of many sorts of breakage shown in FIG. 6.

In one embodiment, a treating step is interposed between the formation of connectors in the exposing step, and the breaking of any unbroken connectors in the separating step, to break or crack the connectors in a controlled fashion. The breaking or cracking is revealed by the separation step that separates the connectors at the location cracked or broken, or guided by the cracks or breaks. In one embodiment of the treating, a large percentage of connectors are broken (or cracked and caused to later break during separation) as in FIG. 6A, near the transferred layer and near the receiver element, leaving the most significant flaps on the donor element upon separation. This treatment outcome can be termed "inboard", since the size of the resulting image is not increased by any significant flap attachment to the image on the receiver element.

In another embodiment, a large percentage of connectors are broken (or cracked and caused to later break during separation) as in FIG. 6B, near the untransferred unexposed transfer layer and near the donor element, leaving the most significant flaps on the receiver element. This treatment outcome can be termed "outboard", since the size of the resulting image is increased by significant flap attachment to the image on the receiver element.

Figure 8A:
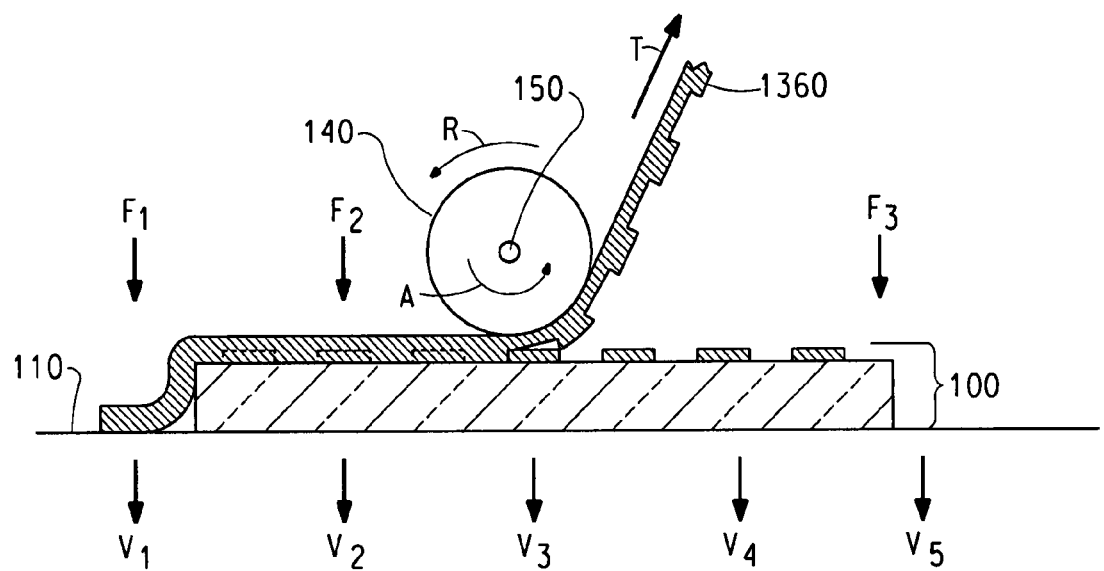
FIGS. 8A, 8B and 8C are cross-sectional views of an assemblage being separated and an assemblage being treated.
Figure 8B:
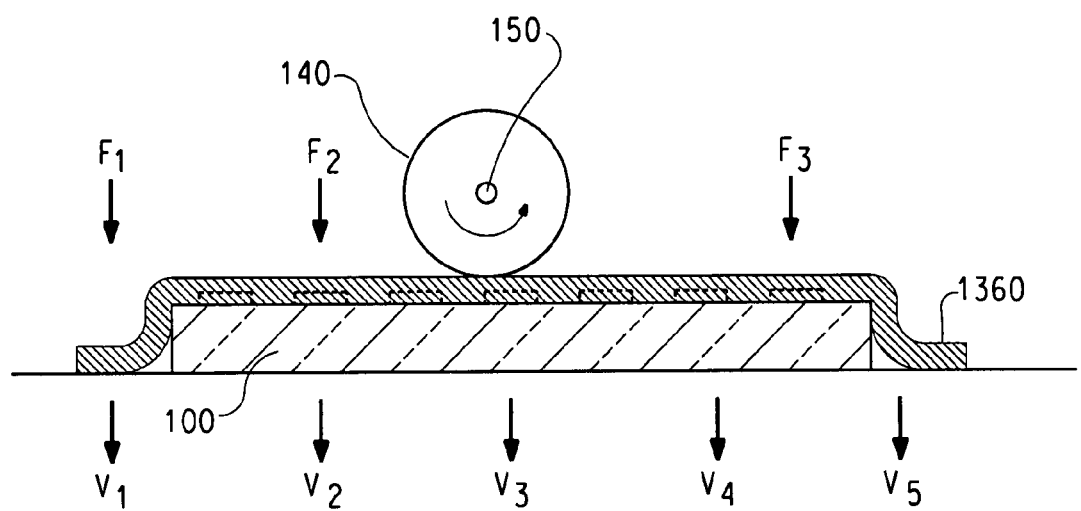
Figure 8C:
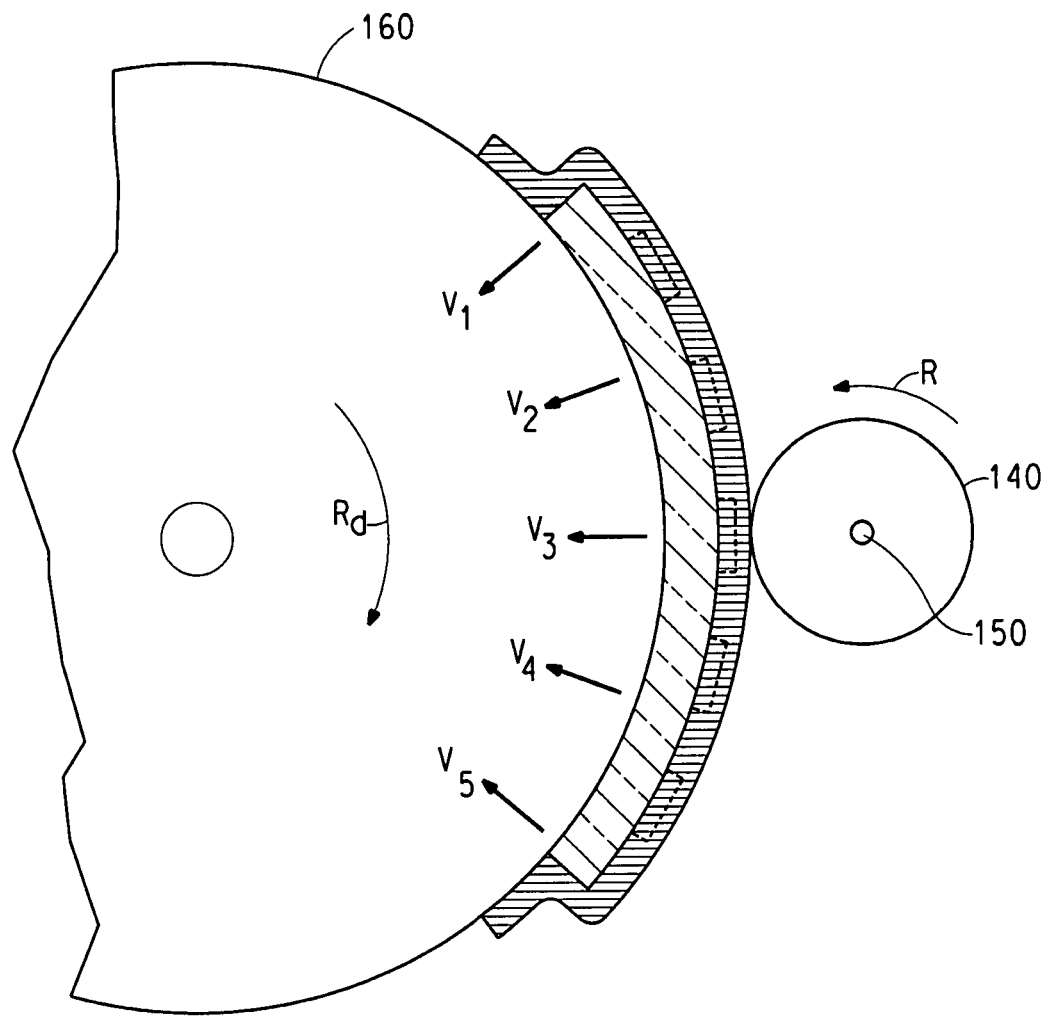

FIGS. 8A and 8B show a separating method using a roller in FIG. 8A as in the prior art, and an embodiment of the present invention comprising a treating step using a roller in FIG. 8B, each carried out on an exposed assemblage on a vacuum table. FIG. 8C shows an embodiment of a treating method carried out on an exposed assemblage held on a vacuum drum.

In FIG. 8A of the prior art, the spent donor element (1360) after exposing and without treatment is lifted off in part of the assemblage at the right of the figure until still held to the receiver element (100) at the left by a roller (140) having an axle (150). The receiver element (100) and portions of the donor element to the left of the roller are held onto sections of a vacuum table (110) and the force of suction V it exerts (V1, V2, V3, V4, V5). The suction around the vacuum table around V1 and V2 serves to remove atmosphere from between the donor element and the receiver, however that vacuum between the elements is absent around V4 and V5. The roller (140) with an axle (150) is traveling to the left as a result of a rotation R. In the case of FIG. 8A, separating of the donor element and receiver element occurs because of an upward force T being exerted on the donor element that pulls the assemblage apart until the point that the roller holds them together. This allows the separating to be done incrementally. The donor element is held onto the receiver element to the left of the roller by a force due to the vacuum table creating a reduced pressure lower than the atmospheric pressure F under the donor element (F1) and under the assemblage (F2). To the right of the roller, no force remains drawing together the donor element and the receiver element, which is itself held onto the vacuum table by the force (F3).

In one embodiment of the treating step in FIG. 8B, the upward force T on the donor element is absent. The force bringing together the donor element and the receiver element due to the vacuum table is basically the same before and after treatment, corresponding to the force on the area to the left of the roller and to the right of the roller respectively. However, the roller rolling over the assemblage can move the donor element relative to the receiver element, and thus create forces on any connector of transfer layer that connects transfer layer associated with the donor element and transferred layer associated with the receiver element. The forces can be significant enough to either crack the transfer layer material of the connector, or to break the transfer layer material. In the case that the connector is only cracked at a location during the treating, during the later separating step the breaking of the connectors can occur along or guided by the crack.

The roller in the treating step can be propelled across the assemblage by any force as is typically used to propel a roller used in the separating step. In one embodiment, the roller rotates so as to cover the same distance along the roller surface as along the assemblage surface, without skidding or jumping. In another embodiment, the roller rotates so as to cover a different distance along the roller surface as along the assemblage surface, the difference accommodated by skidding or jumping.

The roller in the treating step can freely rotate while in contact with the assemblage, or the roller can be tensioned relative to the assemblage. Typically an apparatus is used to move the roller over the assemblage at a certain speed and certain downward pressure of contact between the roller and assemblage. Typically the roller contacts the support layer side of the assemblage, but the receiver element side can be contacted, particularly when the receiver element is flexible.

During separation, for example by take-up of the spent donor element onto a roller, tensioning with a drive force directed as if to increase the rotational speed of the roller is typically used to keep laps of spent donor element on the roller in contact at all locations without wrinkles.

During treating, tensioning can used to impart a movement of the position of the support layer from a first position to a second position relative to the receiver element along a direction substantially parallel to the support layer. Tensioning can involve a braking force resisting rotation of the roller (as would be achieved by a freely rotating roller moved over the assemblage while in contact) or a driving force encouraging rotation of the roller in the direction of rotation produced by movement over the assemblage.

When the roller providing treating is moved forward, and a braking force is applied by a brake to the roller, the force necessary to move the roller forward will increase, and the support layer in good contact with the roller will move forward when encountering the roller and backwards as the roller moves on, ideally undergoing no net movement.

Braking can be provided in any number of ways. For example, in a roller having ball bearings between the roller axle and the roller body, the race holding the ball bearings can be adjusted to be smaller, the ball bearings can be made larger, or a high viscosity lubricant can be used in the race. Disc brakes can be installed between the roller and the axle. Other methods are well known to those skilled in the art.

When the roller providing treating is moved forward, and a driving force is applied by a drive to the roller, the force necessary to move the roller forward will decrease or a force will need to be provided to prevent the roller from accelerating forward, and the support layer in good contact with the roller will move backward relative to the receiver element when encountering the roller and forward as the roller moves on, ideally undergoing no net movement.

A driving force can be introduced to the roller in any number of ways well known in the art. A motor can be mounted on the axle of the roller, and transmit force to the roller through turning a rubber wheel in frictional contact with the roller. A clutch, variation of power to the motor, or slipping of the contact between the wheel and the roller, can modify or limit the amount of force supplied to the roller.

The introduction of a driving or braking force to the treating roller can produce a change in the distance traveled by the periphery of the roller and the distance traveled by the axis of the roller. This change is transmitted to the support layer, and produces the relative movement of the support layer with respect to the receiver element, in the plane of the support layer.

For example, when the roller is traveling over a portion of the donor layer in contact with the receiver element outside any area of imaging, the roller can be forced forward with a force parallel to the support layer, and the axis of the roller and the periphery of the roller will traverse the assemblage at the same rate of distance per unit of time. When a braking action is applied to the periphery of the roller, the rotation of the roller can be slowed, while the speed of the axis over the assemblage can be kept constant (by adjustment of the forward force if necessary). This change in the relative movement of the axis of the roller and the periphery of the roller can cause a shift forward (in the direction of travel of the axis) of the support layer in good contact with the roller, that can be incompletely transmitted to the receiver element, due to breaking of the connectors between the transferred layer on the receiver element and the transfer layer on the donor element.

The relative movement of the support layer over the receiver layer is transmitted to each section of the assemblage as the braked roller approaches and is passed over the section. A restoring movement occurs as the roller is passed over and leaves each section. The net movement is thought to be essentially zero, except for any slight movement caused by effects such as the breaking of the connectors.

FIG. 8C shows one embodiment of the treating step wherein the assemblage is held on a cylindrical vacuum drum. This treating is analogous to that in FIG. 8B; however the roller (140) can be held in one location and allowed to freely rotate, or undergo braking or driving, and the vacuum drum can be rotated in contact with the roller (Rd).

The amount of force transmitted by the roller to the assemblage to cause a relative movement between the support layer and the receiver element, for example moving the position of the support layer from a first position to a second position relative to the receiver element along a direction substantially parallel to the support layer, can typically be varied without bad effect. To illustrate, it is useful to provide a braking or driving force in the roller producing a normalized in-plane shear load on the assemblage by the roller selected from those of at least 5, at least 10, at least 20, at least 40, at least 100, at least 200, and at least 500 N/m. It is usually preferred for no skidding, chattering, or slipping to occur between the roller and the assemblage.

Treatment and separation are distinct. Separation follows treatment and moves apart the spent donor element and the imaged receiver element to a distance where there is no longer any interaction between areas which were formerly touching or in close proximity to one another. At the end of separation, no intact complete connectors exist between the spent donor element and the imaged receiver element in the area of separation, and the spent donor element and the imaged receiver element are not in contact and are not held together by a force in the area of separation.

Separation is also a process by which within an area of contact between the donor element and the receiver element, the elements are taken out of contact, and in such area where contact no longer exists, the donor element and the receiver element are left with no forces acting upon either or both of the donor element and the receiver element capable of bringing them back into contact.

In one embodiment, the treating step causes a first travel of a first distance of the support layer relative to the receiver element, followed by a return travel of a second distance of the support layer relative to the receiver element, leaving the support layer at a third distance from the original position of the support layer and the receiver element after exposing and before treating, wherein at the completion of the return travel the support layer is closer to its original position with respect to the receiver element than at the completion of the first travel (the third distance being smaller than the first distance). In another embodiment, the third distance is smaller than the first distance, and the third distance is smaller than the second distance. In another embodiment, the third distance is smaller than the first distance, and the third distance is smaller than the second distance, and the first distance is equal to or greater than the second distance.

We have recognized that methods used in the known art for separation of exposed assemblages are rather uncontrolled with respect to their effect on the location of breaks between the transfer layer associated with the donor element and transfer layer associated with the receiver element. Since we recognize that connectors between exposed and unexposed areas are common in thermal transfer imaging, the effects of uncontrolled breakage of connectors can be seen after separation of the assemblage and understood as being due in large part to the breaking of connectors. Rapid uncontrolled random breaking will give edges between exposed and unexposed areas that vary in size and can be accompanied by debris made by shattering of connectors. These edges will appear rough or wavy when intended to be smooth.

Treating of the assemblage before separating, or before loss of vacuum, or before large movements of the donor element away from the receiver element allows an opportunity or opportunities to break connectors in a controlled fashion. Two types of controlled fashions are breaking close to the undisturbed transfer layer, and breaking close to the transferred layer (a preferred embodiment when the receiver element is more valuable than the spent donor, because flaps add complication to the element with which they are associated).

The width of a connector (its distance over the direction from the transferred layer to the untransferred transfer layer) in one form of thermal transfer imaging can be about 6 microns for transfer of a circa 150 micron wide stripe of a 2-3 micron thick transfer layer. Variation in the location of breaking of the connectors alone (not including breaking in a non-connector location) can thus vary the width of a stripe having two edges by 12 microns. Such a variation can mean that a color filter stripe not exactly centered over a window might either not cover the glass region of the window, leaving a stripe where white light will be transmitted through the window in a liquid crystal display, or that a color stripe might cover up an unexpectedly large amount of the black mask and also cover at least an edge portion of an adjacent different color filter stripe on the black matrix from a previous imaging, giving a region that is unexpectedly tall on the color filter due to overlapping color filter stripes. Debris of transfer layer material can form when the connector breaks at multiple locations and becomes free of both the spent donor element and the imaged receiver element-debris that the agitation of separation might carry to another window location.

In one embodiment, the separation of a donor element using a guide roller 80 mm in diameter as in FIG. 8A, traveling at 275 mm/second gives the donor element an apparent velocity of departure from the receiver element of up to 275,000 microns per second. Under such conditions, it is not unreasonable to expect that the location of a break propagating along the unseparated transfer layer might vary by 6 microns or more, even possibly dislodging transfer layer from its attachment to the donor element or dislodging transferred layer from its attachment to the receiver element. If the approach angle of the line of separation (the line defined by the nip of the roller) varies, it might also be expected that the location of a break propagating along the transfer layer might vary. If the forces contributed by the vacuum table are released simultaneously with separation (by breaking the vacuum at the peeling edge while vacuum is maintained on the unseparated assemblage), forces will also likely be created by air rushing in to the assemblage to fill regions of lowered atmospheric pressure. Those forces might break connectors, or might scatter fragments of connectors formed by rapid separation.

In an inventive embodiment, the exposed assemblage is treated before the separation of the assemblage by breaking, cracking, or weakening the connectors in a controlled fashion at a specific relative location (typically close to the receiver element, but not limited to that location). The treatment involves manipulating the assemblage so that upon disassembly by the separating step, the breaks between the transfer layer associated with the donor layer and the transfer layer associated with the receiver element are predominantly at one relative location. In one embodiment, the breaks are predominantly near the transfer layer associated with the spent donor element, and the connector of transfer layer remains attached to the transfer layer associated with the imaged receiver element as a flap. In another more preferred embodiment, the breaks are predominantly near the transfer layer associated with the imaged receiver element, and the connector of transfer layer remains attached to the transfer layer associated with the spent donor element as a flap.

Figure 9:
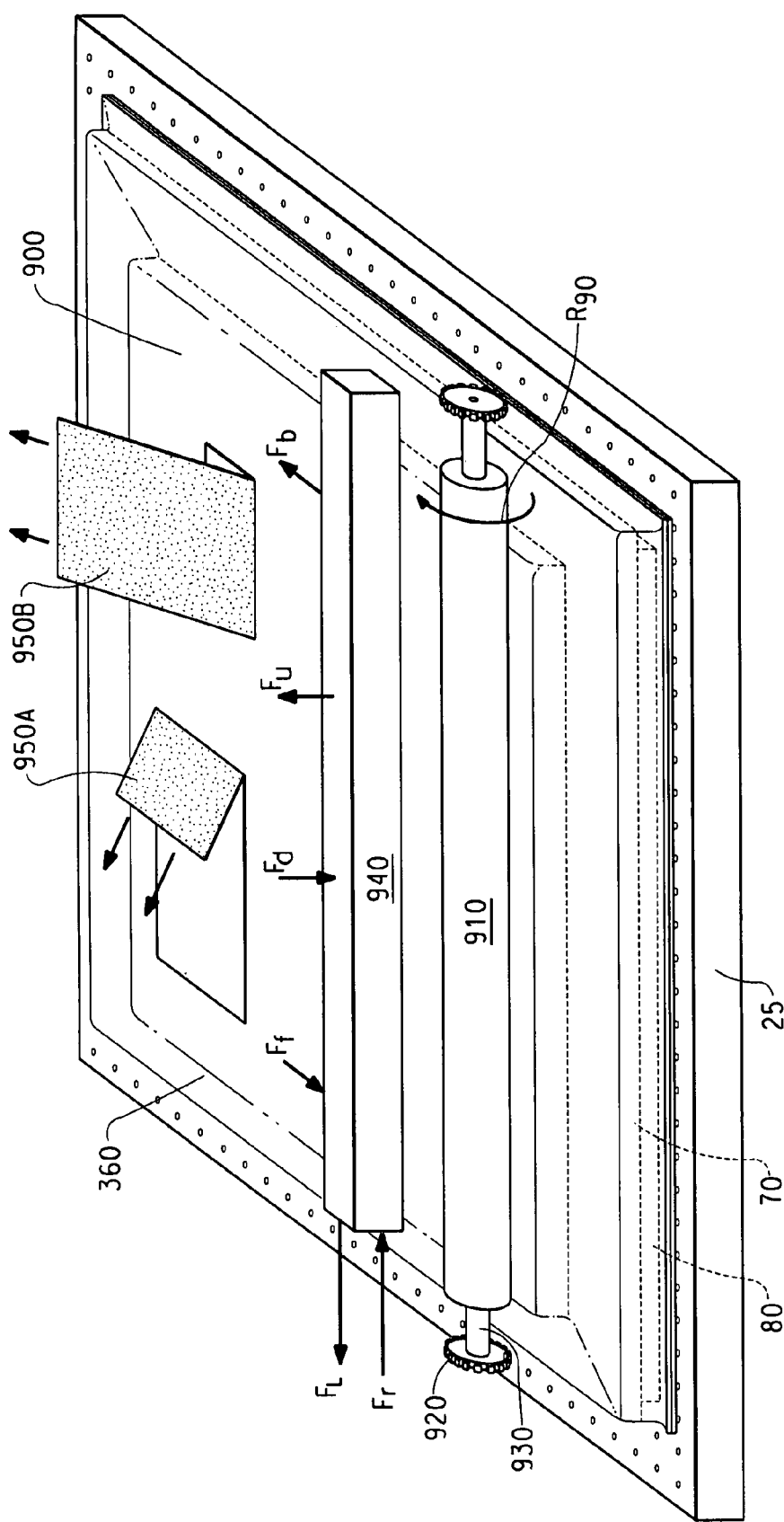
FIG. 9 is a perspective view showing treatments of an imaged assemblage by an adhesive tape application and removal, by an object that can impart movement, and by a roller.

FIG. 9 shows an assemblage (900) held by vacuum on a vacuum table (25) being treated in various ways. The instruments carrying out the treating include a roller (910), a bar (940) and two instances of removable adhesive tape (950A and 950B). The assemblage is recognizable through the donor element (360) with support layer (70) uppermost and covering the receiver element and a portion of the vacuum table completely surrounding the receiver element, with transfer layer (80) in contact with at least a portion of the receiver element. The treatment comprises moving a roller (910) across the spent donor element support layer surface of the exposed assemblage. The roller shown is held down by the force of gravity and being moved from front to back while rotating clockwise as viewed from the right side. In other embodiments, a force other than gravity can hold the roller in contact with the assemblage. Whatever force is used, it is sufficient to move the support layer towards the receiver element in at least some location. In other embodiments, the roller need not be freely rotating at a speed identical to the rate of travel, and a speed of rotation can be set for example through gears (920) on an axle (930) that provide a shear or buffing force onto the support layer as the roller is moved over the assemblage. The unequal forward motion and speed of rotation can impart a shearing motion to the assemblage, moving the position of the support layer from a first position to a second position relative to the receiver element along a direction substantially parallel to the support layer.

In various embodiments the roller surface in contact with the support layer is adhesive or compliant or both. Moving the roller across the spent donor element support layer momentarily changes the forces (such as those due to the vacuum table) previously holding the spent donor element and the imaged receiver element in a fixed relationship in the exposed assemblage, and can move the elements with respect to one another in a small area of the assemblage at a given instant during the treatment, before the original force due to only the vacuum table is restored to that area of the assemblage and the support layer and receiver elements are restored to their previous relationship or a different relationship. These changes affect the connectors, e.g. by breaking, cracking, or otherwise preparing them for separation to create flaps at a specific location.

Figure 10:
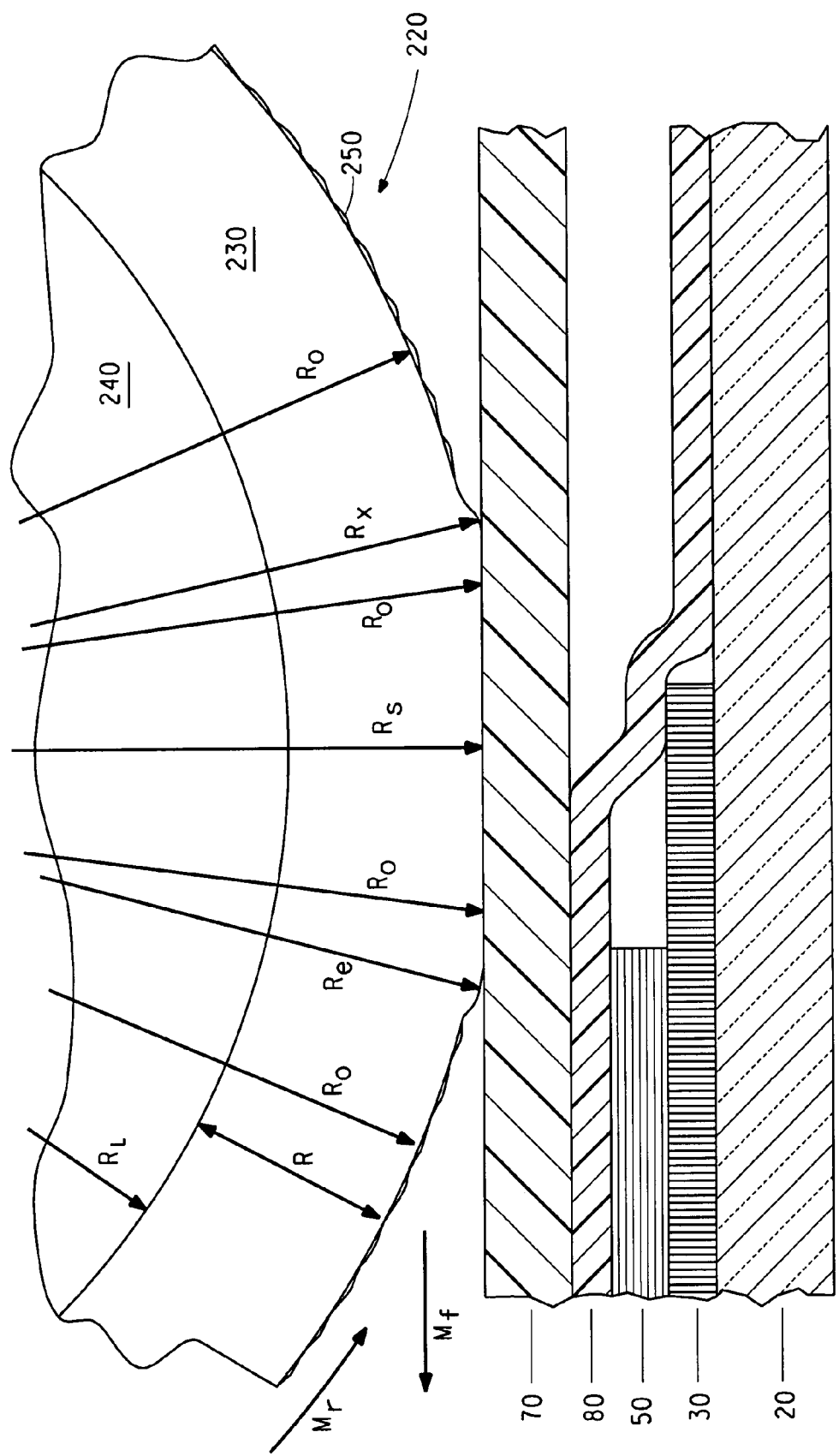
FIG. 10 is a cross-sectional view of a roller in contact with an assemblage.

FIG. 10 shows one embodiment of a compliant adhesive roller rolling over an exposed assemblage. The receiver element comprising glass (20), black matrix (30), and blue filter layer (50), and the donor element comprising a support layer (70), share a transfer layer (80) that is partitioned between at least three states: original undisturbed transfer layer to the left of the figure, transferred layer associated with the receiver element black matrix and glass to the right of the figure, and the connector between the two, as shown in previous figures. Passing over the assemblage is a roller (220), moving as shown by the rotation Mr to pass over the assemblage from right to left (Mf). The roller is a cylinder that has a undisturbed radius Ro and comprises an inner core (240) of an inner composition with radius Ri<Ro and at least one more outer layer of thickness Rc<=Ro−Ri of a compliant and/or adhesive composition different from or the same as the inner composition. The adhesive outer surface (250) can be the same or different material than the compliant thick layer 230). (In this illustration, the adhesive is illustrated as having a thickness that would change the radius of the roller, but for the purpose of this discussion, it should be considered as having a negligible thickness.) As the roller contacts the assemblage, it may be pressed into contact by gravity or a closing force and thereby deformed, or it may be deformed by the rolling motion and adhesion of the adhesive. The deformations of the roller can include a radius larger than Ro at the entrance area (Re) where the assemblage is first contacted by the advancing roller and the exit area (Rx) due to bulging, for example. A shorter radius for the roller can be found between the entrance and exit, Rs<Ro, due to compression or bulging for example.

The increased radius of the roller at the entrance area and the exit area can be caused by bulging of the material compressed between the entrance and the exit at radii shorter than Ro, such as Rs. The increased radius at the exit area can be caused by the adhesive properties of the roller delaying separation of the roller from the support layer—a stretching of the roller adhered to the donor element incrementally drawn away from it. That attachment of the roller surface adhered to the donor element while the rotation of the roller increases the distance from the roller to the donor element can cause the support layer to draw apart from the receiver element fixed on the vacuum table as the support layer follows the roller. Upon release of the adhesive roller, the support layer can move towards the receiver element fixed on the vacuum table.

It is also possible for the roller to push the support layer in the direction of the roller travel with respect to the immobile receiver element when beginning contact with the roller, due to the forces pushing the roller forward, or other forces, being transferred to the support layer.

The shorter radius Rs can be caused by the deformation of the roller caused by the force of gravity or other force pushing the roller into contact with the assemblage donor element support layer. Movement of the support layer towards the receiver element can occur simultaneously with the deformation to a shorter radius Rs. As the roller moves on, the radius increases again and the support layer can move away from the receiver element.

The differing radii of the roller in intimate coupled contact with the support layer at different times can create forces on the support layer that can move the support layer with respect to the receiver element. The coupling of the movement of the roller to the support layer can be greater than the coupling of the support layer to the receiver element because of the imperfect coupling of the donor element to the receiver element through the transfer layer. The coupling of the support layer to the receiver element can be by any contact of one element to the other, e.g. green transfer layer to blue transfer layer, or connection by a connector, or it may be absent in a location by no actual contact being in effect at the location, such as when the transfer layer is suspended above the glass with no intervening black matrix or color filter layer making contact.

The movement of the roller over a point of the assemblage from a region of low compression (long radii such as Re) to a region of high compression (short radii such as Rs) can cause the movement of the support layer towards the receiver element. This approaching movement of the support layer relative to the receiver element can stress the connectors, causing breakage.

The movement of the roller over a point of the assemblage from a region of high compression (short radii caused by compression) to a region of low compression (long radii, caused by relieving compression) can cause the movement of the support layer away from the receiver element. This outward movement of the support layer relative to the receiver element can be a restoring movement after a movement of the support layer towards the receiver element, towards but not exceeding the original separation and positioning of the donor element and the receiver element just before the roller affects it.

In the case where Rx>Ro, and the roller adhered to the support layer, the roller can lift the support layer away from the receiver element as roller material unbulges. This can be an outward movement of the support layer relative to the receiver element with respect to the original separation and positioning before the roller contacted the support layer. Both types of outward (away from) movements of the support layer relative to the receiver element can stress the connectors and cause breakage.

The forces generated by the roller by means of changing these radii and compliant layer movements can cause movement of the support layer, parallel to the surface of the support layer facing towards the transfer layer, and the receiver element. This direction is perpendicular to the movement of the support layer purely towards or away from the receiver element. This direction is typically parallel to the plane of directions defined by the relative movements of the laser head over the assemblage. One way of recognizing these forces is to account for the movement of the roller material due to bulging. The bulging moves roller material away from the point of minimum roller radius distance. This movement creates a force similar to wiping or rubbing the support layer, all of which will move it relative to the receiver layer from a first position to a second position in a direction parallel to the support layer, perpendicular to the closing or separating direction. This movement, that we call an assemblage shearing movement, can stress the connectors, causing breakage.

Connectors are found between the edge of transferred layer and the edge of transfer layer. Typically, the transferred layer edge and transfer layer edge are parallel, and a direction tangential to the two edges exists, in the plane of the possible directions parallel to the support layer. When the movement from the first position to a second position is in the majority parallel to the direction tangent to the two edges, we can call the movement an edgewise assemblage shearing (EAS) movement. When the movement from the first position to a second position is in the majority perpendicular to the direction tangent to the two edges, and such that the distance between the transfer layer and transferred layer is increased and subsequently the connector is stretched overall, we can call the movement an connector-stretching assemblage shearing (CSAS) movement. When the movement from the first position to a second position is in the majority perpendicular to the direction tangent to the two edges, and such that the distance between the transfer layer and transferred layer is decreased and subsequently the connector is compressed overall, we can call the movement an connector-compressing assemblage shearing (CCAS) movement. Since the collection of connectors in a single assemblage can comprise many orientations of edges, usually all three types and mixed types of assemblage shearing movements are caused by a treating step. In one embodiment, edges of the transfer layer and transferred layer are aligned in the majority in one parallel direction, and the assemblage shearing movements are in the majority in that direction. For example, in a color filter where each donor element is used to apply long columns of color filter material, the longest edges of the columns are aligned parallel, and this direction in the majority defines the direction of the second position from the first position. The direction could be the same as the main movement of a laser head that transferred the transfer layer, or the direction could be opposite, or the direction could be perpendicular, in the most common relationships of the exposing step alignment to the treating step alignment.

In one embodiment, the rolling of the roller for treating the assemblage is carried out while the assemblage remains subject to forces that leave the majority or all of the donor element closely aligned or in contact with the receiver element, for example by use of the vacuum table evacuation. In another embodiment, at some time during the time necessary to treat the entire assemblage, a separating method is applied to portions of the assemblage that have been treated.

In one embodiment, two distinct rollers are used for treating and separating. The treating roller can comprise an adhesive compliant surface, and the separating roller can comprise a non-compliant surface. In another embodiment of treating shown in FIG. 9, an adhesive tape (950A, 950B) can be applied over an area of the exposed donor element support layer surface of the assemblage, and then removed by peeling. In FIG. 9, for each tape the peel angle is nearly 180 degrees as the free end of the adhesive tape is moved from right to left (950A) or back to front (950B) to create new forces at the bent edge of the tape on the exposed assemblage. These forces are mainly shearing forces, moving the position of the support layer from a first position to a second position relative to the receiver element along a direction substantially parallel to the support layer.

In one embodiment, the removal of the adhesive tape is carried out while the assemblage remains subject to forces that leave the majority or all of the donor element closely aligned or in contact with the receiver element, for example by use of the vacuum table evacuation.

In yet another embodiment shown in FIG. 9, a bar (940) provides the treating. In separate embodiments, the bar can be in frictional or adhesive or compliant contact with the support layer of the exposed assemblage, which associates the movements of the bar with the support layer. Adhesive contact, due to an adhesive on the surface of the bar contacting the support layer, allows an upward motion of the bar away from the assemblage to be translated to the support layer to provide a movement of the support layer away from the receiver element held in position by the vacuum table.

Compliant contact serves to increase the association of the movements of the bar with a corresponding movement of the support layer by conforming the surfaces of each together and providing a high friction bond that resists slipping at the interface between the two. This particularly allows shearing movement to be translated from the bar to the support layer.

The force providing an upward movement to the bar is labeled Fu in FIG. 9. The bar can be clamped to a lifting mechanism such as a crane (not shown) to provide an upward movement.

A downward force Fd, a rightward force Fr, a leftward force Fl, a backwards force Fb, and a forwards force Ff can be applied to cause movement of the bar and the associated support layer in the indicated direction, with the movement being relative to the receiver element constrained by the vacuum table or inertial forces. The above forces can be applied by any convenient means, such as by striking with a hammer or by use of a motor.

While not being bound by any theory, the utility of the present invention may be due to the controlled forces used in breaking or fracturing the connectors, rather than having the breaking or fracturing occur during separation when it may be rapid and uncontrolled. Typically in the separation step, the force(s) holding the donor element and receiver element in a basically fixed arrangement are either removed or overcome, and evacuation between the two elements is replaced by gas(es) (typically air). The new forces on the connectors of separation and of gas flow and the distances involved in separation are quite sufficient to break the connectors, perhaps at multiple positions that can generate debris.

By introducing presumably very small displacements of the support layer relative to the receiver element during treating, the breakage of the connectors can occur at a single predictable location, and propagation of a single crack can occur and relieve stresses before other cracks form and propagate.

In one embodiment, the assemblage is held relatively immobile during exposing and treatment by rigidity of the receiver element (such as 500 micron thick glass on a rigid vacuum table) and a force or forces holding the donor element in contact with the receiver element, such as air pressure on the donor element support layer pressing the donor element down when the volume between the donor element and the receiver element is evacuated (by a relative vacuum supplied by the vacuum table). However, it is envisioned that alternative assemblages such as those of U.S. Pat. No. 5,633,113, "MASS TRANSFER IMAGING MEDIA AND METHODS OF MAKING AND USING THE SAME", by Ernest W. Ellis to Polaroid Corporation, would be appropriate to the invention as well. For example, an enclosure, pouch, or envelope having an exposed assemblage could be placed in a press or apparatus capable of pressing or shearing the enclosure, pouch, or envelope, thereby causing the same movements in the assemblage as for one on a vacuum table.

In one embodiment, the separating step completely removes the spent donor element transfer layer from contact with the receiver element. In one embodiment, the treating is carried out by means of a parallel movement of the support layer relative to the receiver element. In another embodiment, rather than a parallel movement, a separating movement or a compressing movement of the support layer relative to the receiver element is carried out. In yet another embodiment, a movement is carried out that has elements of parallel and perpendicular movement, the movement being more parallel than perpendicular when resolved into distance components. In another embodiment, the treatment comprises two movements are carried out in succession, a movement of the support layer away from the receiver element preceding a movement of the support layer towards the receiver element. In one embodiment, the movement away and the movement towards are both less than 10 microns in total distance when complete; in another embodiment, less than 100 microns; in another embodiment less than 1 millimeter. In all such embodiments of relative movement of the support layer relative to the receiver element, it is not required that all areas of the support layer must undergo the relative movement at the same time. In fact, it is preferred that the assemblage undergo the treatment one area at a time. In this way, the treating of the assemblage one piece at a time by moving the support layer away from and towards the receiver element is different than separating because separation carries out a large moving away without a subsequent moving toward.

In one embodiment, treating is carried out all over the exposed area at one instant, for example by a bar that entirely covers the exposed area. In such a case, the time between the beginning of treatment and the beginning of separation is termed the "treatment-to-separation time".

In one embodiment, treating is carried out incrementally over an area of the exposed assemblage. Incremental treatment is recognizable because when an area is undergoing treatment, there are other nearby areas that are not yet separated but were treated at a time in the past, and other nearby areas that are not yet treated, but are treated at a time in the future. In the case of incremental treatment, the time that separates the beginning of treatment of an area from the beginning of separation of an area is called the treatment-to-separation time.

The presence of treated unseparated areas and untreated unseparated areas nearby an area undergoing treatment is a preferred embodiment of the invention that indicates treatment is carried out with minimal disturbance of areas of the assemblage due to separation. To describe the presence of treated unseparated areas and untreated unseparated areas nearby an area undergoing treatment, we use the shortest distance between an area undergoing treatment and an area undergoing separation, measured along the surface of the support layer closest to the transfer layer. This is termed the "treatment-to-separation distance".

For example, on a flat vacuum table an assemblage could be treated with an adhesive compliant treating roller 80 mm in diameter and 1 meter long having a footprint on the assemblage 1 cm wide and 1 meter long, whose axis of rotation is separated by 100 mm from the axis of an attached non-compliant separating roller 80 mm in diameter having a footprint of 0.4 cm wide and 1 meter long, so that midway through treatment it is noted that an area undergoing treatment is at least 93 mm distant from an area undergoing separation.

The current invention can be applied to methods having a treatment to separation time of greater than at least one of 0.01, 0.1, 0.5, 1, 3, 10, 30, and 60 seconds. The current invention can be applied to methods having a treatment to separation distance of greater than at least one of 0.01, 0.1, 0.5, 1, 3, 10, 30, and 60 centimeters.

An area where the methods of the invention can be used are for the manufacture of a color filter, for example a three-color filter suitable for a liquid crystal display. Separate methods and materials useful in manufacture of a color filter are given for example in U.S. Pat. No. 6,682,862 by Youn-Gyoung Chang et al., and U.S. Pat. No. 6,645,681 to G. Andrews, et al. Examples of the application of the third color of a three color filter are given below; analogous techniques can be used with red and blue donor element films and other donor element films and receiver elements.

In the context of this specification and the claims, the term "radiation" is used conventionally to mean electromagnetic radiation. For example, radiation can be ultraviolet radiation (UV), infrared radiation (IR), or visible (VIS) radiation of the electromagnetic spectrum. UV and IR radiation can be further characterized as deep, mid, far, or near. A lamp or a laser can supply a beam of radiation. Radiation can be selectively exposed on the assemblage using a mask. This invention contemplates embodiments where exposing of three or more features occurs simultaneously, for example by a laser head having multiple controllable laser beams. For an exposing head capable of exposing multiple features simultaneously, lasers are particularly preferred, and therefore will be used for descriptive and illustrative purposes. In one embodiment, a multiplicity of infrared-emitting diode lasers provides a multiple-beam exposing head that can be scanned across an assemblage. In one embodiment the exposing head has about 200 abutted beams emitting mainly at around 832 nm, each beam capable of illuminating a rectangular region 20 microns wide perpendicular to the scan direction, thereby capable of spanning a 4 mm band or stripe of assemblage while writing a number of features simultaneously when moved over the assemblage. Typically there is a known relationship between the area illuminated and the area transferred, which is nearly one to one. The width transferred by a contiguous set of illuminated beams bordered by an unilluminated area defines a local width. Scans of the multiple-beam exposing head can occur at any convenient speeds, such as at or between 0.1, 1, 2, 5, and 10 meters per second. The speed and duration of exposing defines the local length of an area or feature. The beams of light can be modulated by any conventional technique, such as a linear light valve. Gelbart describes a suitable apparatus in U.S. Pat. No. 5,517,359.

In the context of this specification and the claims, the term "thermal transfer" is used conventionally. The mode of thermal transfer can vary depending on the type of irradiation, the type of materials in the transfer layer, etc., and generally occurs via one or more mechanisms, one or more of which may be emphasized or de-emphasized during transfer depending on exposing conditions, donor constructions, and so forth. The following modes of thermal transfer are not limiting to the invention, and are given for illustrative purposes only of possible embodiments of the invention.

One speculated mechanism of thermal transfer includes thermal melt-stick transfer whereby localized heating at the interface between the transfer layer and the rest of the donor element can lower the adhesion of the thermal transfer layer to the donor in selected locations. Selected portions of the thermal transfer layer can adhere to the receiver element more strongly than to the donor so that when the donor element is removed, the selected portions of the transfer layer remain on the receiver element. Another speculated mechanism of thermal transfer includes ablative transfer whereby localized heating can be used to ablate portions of the transfer layer off of the donor element, thereby directing ablated material toward the receptor. Yet another speculated mechanism of thermal transfer includes sublimation whereby material dispersed in the transfer layer (e.g. a dye) can be sublimated by heat generated in the donor element. A portion of the sublimated material can condense on the receptor. Dye diffusion thermal transfer is also possible, where dye diffuses from the transfer layer of the donor element to the receiver element, without wholesale transfer of the transfer layer.

Thermal transfer can utilize a mechanism referred to as laser-induced film transfer (LIFT) and multi-LIFT, which is utilized when there is more than one layer of transfer material as well as when one layer of material forms the transfer layer. Such systems have been reported in U.S. Pat. No. 5,935,758 (Patel et al.) and U.S. Pat. No. 6,899,988 (Kidnie et al.). Using the LIFT or multi-LIFT systems, a half tone image can be formed by the transfer of discrete dots of a transfer layer, e.g. one of binder, colorant and additives from the donor element to a receiver element. The dots can be formed from a molten or softened film and have well-defined, generally continuous edges that are relatively sharp with respect to density or edge definition; in other words, the dots are formed with relatively uniform thickness over their area. Dye transfer methods can involve transfer of the colorant without the binder and some mass transfer methods such as ablation can propel fractions of the transfer material but at least partially decompose the binder.

Thermal mass transfer processes are useful in embodiments of the present invention. Thermal mass transfer processes include thermal transfer processes where a mass or volume of the transfer layer transfers to the receiver element with no significant change in overall composition. Idealized thermal mass transfer would transfer the entire volume of the transfer layer from an area of the donor element, but practically speaking it is acceptable if residues of the transfer layer remain on the donor element, and if the thermal processes of the exposing cause some changes of the transfer layer such as partial decomposition or crosslinking. Thus thermal mass transfer encompasses at least ablative transfer, laser induced film transfer, and melt transfer, but excludes dye diffusion transfer and sublimation transfer.

During exposing, the thermal transfer donor element can be brought into intimate contact with a receiver element (as might typically be the case for thermal melt-stick transfer mechanisms) or the thermal transfer donor element can be spaced some distance from the receiver element (as can be the case for ablative transfer mechanisms or transfer material sublimation mechanisms).

In the context of this specification and the claims, the term "radiation-induced thermal transfer process" is used conventionally. For example, the radiation produced by a near-infrared laser is used to illuminate some but not all areas of the support layer of the assemblage, causing the transfer layer to transfer as discussed elsewhere in the specification. The exposing causes the "radiation-induced thermal transfer process", and is conveniently done through the support layer or through the receiver element.

In the context of this specification and the claims, the term "image" is used conventionally. An image can be bilevel or continuous tone (contone). In one embodiment, the utility of the present invention extends to bilevel imaging. In bilevel imaging, the percentage of transfer layer deposited on the receiver element in the imaged areas is relatively close to 100%, and nearly constant, over a range of successful imaging powers; the percentage is basically not continuously variable from 0 to 100% by changes in the exposing power as in continuous tone imaging. Bilevel imaging is well suited to line art, halftone imaging, and manufacturing such as color filter production. Mechanisms of assemblage exposing known for utility in bilevel imaging include melt transfer, ablative transfer, and laser induced film transfer.

In the context of this specification and the claims, the term "donor element" is used conventionally. For example, a donor element comprises a support layer and a transfer layer that can be "donated" to a receiver element. A donor element typically comprises at least one component that absorbs radiation and converts the radiation to heat which more directly causes the transfer.

Donor elements for use with a receiver element, in an imageable assemblage for light-induced transfer of material from the donor element to the receiver element, typically include multiple layers. The layers can include, but are not limited to, a support layer, a light-to-heat conversion (LTHC) layer, and a transfer layer. Typically, a support layer such as a 50 µm polyethylene terephthalate film is sequentially coated with a light-to-heat conversion layer precursor. The precursor is then converted to a final light-to-heat conversion layer by drying to remove water and/or solvents, and subsequently a transfer layer precursor is coated above the light-to-heat conversion layer, opposite the support layer, and converted to a transfer layer by drying.

A light absorber can be included in the donor element to increase the amount of radiation, e.g. laser light, absorbed in a layer of the donor element. The light absorber can take many forms, but typically is an efficient absorber of the laser light used for imaging, and preferably is a selective absorber. An efficient absorber can be used in small amounts, and a selective absorber will be unlikely to interfere with other optical properties such as color or transparency of the donor element and particularly the transfer layer.

Typically, the light absorber absorbs light in the infrared, visible, and/or ultraviolet regions of the electromagnetic spectrum, preferably as found in the imaging laser light. The light absorber is typically highly absorptive of the selected imaging laser light, providing an absorbance at a wavelength of the imaging laser light in the range of 0.2 to 3 in one embodiment, and from 0.5 to 2 in another embodiment. Absorbance is the absolute value of the logarithm (base 10) of the ratio of a) the intensity of light transmitted through the layer (typically in the shortest direction) and b) the intensity of light incident on the layer. For example, absorbance of 1 corresponds to transmission of 10% of incident light intensity; absorbance of greater than 0.4 corresponds to transmission of less than approximately 40% of incident light intensity.

Suitable light absorbing materials can include, for example, dyes (e.g., visible dyes, ultraviolet dyes, infrared dyes, fluorescent dyes, and light-polarizing dyes), pigments, metals, metal compounds, metal films, and other suitable absorbing materials. Examples of suitable light absorbers can include carbon black, graphite, metal oxides, metal sulfides, organic compounds such as cyanine based, polymethine based, azulenium based, squarylium based, thiopyrylium based, naphthoquinone based, or anthraquinone based dyes; and phthalocyanine based, azo based, or thioamide based organic metal complexes. Cyanine dyes are preferably used with infrared laser illumination, since they show a high absorption coefficient in the infrared region, and the thickness of a laser light absorbing layer can be thinned when used as the light-to-heat converting material, as a result, the imaging sensitivity of a donor element can be further improved.

The light absorber can be present in the transfer layer or another layer, for example a layer between the transfer layer and the support layer. A layer separate from the transfer layer comprising a light absorber can be termed a light-to-heat conversion layer, since during imaging with laser light the light absorber will absorb light and give off heat, but can be substantially or completely untransferred in contrast to absorber found in the imaged transfer layer in the imaged region of laser illumination.

In the present invention, the support layer and transfer layer can sandwich the light-to-heat conversion layer. Donor elements may optionally include other layers, for example disposed between the support layer and the transfer layer (e.g. an interlayer), on the side of the support layer opposite the transfer layer (e.g. an antistatic layer), and on the side of the transfer layer opposite the support layer (e.g. an adhesive layer). Since an adhesive layer would be transferred by thermal mass transfer, in such a case the adhesive layer would be considered a part of the transfer layer, with the transfer layer being of multiple differing layers. Such multilayer transfer layers are well known.

In the context of this specification and the claims, the term "support layer" is used conventionally. The support layer can provide a practical means of handling the donor element with its functional layers, for example during manufacturing, in making the imageable assemblage, and in separating the spent donor element from the imaged receiver element after exposing of the assemblage. In such aspects, the support layer is conventional, acting as a substrate for layers that may be substantially changed during exposing (for example, created, moved, decomposed, melted, etc.). As a side effect of exposing, the support layer may undergo changes as well, but these do not remove the utility of the support layer in carrying the other layers.

The support layer can be a polymer film. One suitable type of polymer film is a polyester film, for example, polyethylene terephthalate or polyethylene naphthalate film. However, other films with sufficient mechanical and thermal stability for the particular application, and optionally, sufficient optical properties, including high transmission of light at a particular wavelength, can be used. Examples of suitable polymers for a support layer include polycarbonate, polyolefin, polyvinyl resin, or polyester. In one embodiment, synthetic linear polyester is used for the support layer.

Synthetic linear polyesters useful as the support layer may be obtained by condensing one or more dicarboxylic acids or their lower alkyl (up to 6 carbon atoms) diesters, e.g., terephthalic acid, isophthalic acid, phthalic acid, 2,5-, 2,6- or 2,7- naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, e.g., ethylene glycol, 1,3-propanediol, 1,4-butanediol, neopentyl glycol and 1,4-cyclohexanedimethanol. An aromatic dicarboxylic acid is preferred. An aliphatic glycol is preferred. Polyesters or copolyesters containing units derived from hydroxycarboxylic acid monomers, such as ω-hydroxyalkanoic acids (typically C3-C12) such as hydroxypropionic acid, hydroxybutyric acid, p-hydroxybenzoic acid, m-hydroxybenzoic acid, or 2-hydroxynaphthalene-6-carboxylic acid, may also be used. In one embodiment, the polyester is selected from polyethylene terephthalate and polyethylene naphthalate.

The support layer may comprise one or more discrete layers of the above film-forming materials. The polymeric materials of the respective layers may be the same or different. For instance, the support layer may comprise one, two, three, four or five or more layers and typical multi-layer structures may be of the AB, ABA, ABC, ABAB, ABABA or ABCBA type.

Formation of the support layer may be accomplished by conventional techniques. Conveniently, formation of the support layer is effected by extrusion. In general terms the process may comprise the steps of extruding a layer of molten polymer, quenching the extrudate and orienting the quenched extrudate in at least one direction.

The support layer may be unoriented, or oriented any number of times, for example uniaxially-oriented, or biaxially-oriented. Orientation may be effected by any process known in the art for producing an oriented film, for example a tubular or flat film process. Biaxial orientation may be effected by drawing in two mutually perpendicular directions in the plane of the film to achieve a satisfactory combination of mechanical and physical properties.

The support layer is typically thin and coatable so that uniform coatings can be conveniently applied and concentrated into subsequent layers, and the final multilayer donor element can be conveniently handled in sheet or roll form. The support layer composition is also typically selected from materials that remain stable despite heating of the light-to-heat conversion layer during exposing. The typical thickness of the support layer may range from about 0.005 to about 0.5 mm, for example about 15 μm, about 25 μm, about 50 μm, about 100 μm, or about 250 μm thick film, although thicker or thinner support layers may be used. The width and length dimensions of the support layer are chosen for convenience of handling and for dimensions of the receiver element to be imaged, for example a width of from about 0.1 to about 5 m, and a length of from about 0.1 to about 10,000 m.

Metallized films can be used as a support layer for a donor element. Specific examples include single or multilayer films comprising polyethylene terephthalate or polyolefin films. Useful polyethylene terephthalate films include MELINEX® 473 (100 μm thickness), MELINEX® 6442 (100 μm thickness), MELINEX® LJX111 (25 μm thickness), and MELINEX® 453 (50 μm thickness), optionally metallized to 50% visible light transmission with metallic chromium by CP Films, Martinsville, Va. The metal layer can be oriented on the transfer layer side or opposite the transfer layer. A metal layer as above can act as a radiation absorber and heat producer to cause thermal transfer when oriented on the transfer layer side.

Other conventional layers can be used in a donor element of the present invention, for example an interlayer or release layer as in U.S. Pat. No. 6,228,543 of Mizuno et al., a dynamic release layer as in U.S. Pat. No. 5,171,650 of Ellis et al., or an ejection layer as in U.S. Pat. No. 6,569,585 of Caspar et al., all incorporated herein by reference.

The support layer is usually reasonably transparent to the exposing radiation, which usually impinges on it prior to reaching a light-to-heat conversion layer or the transfer layer, for example a support layer having a light transmittance at the exposing wavelengths of about 90% or more. The support layer can be a single layer or a multilayer. Also, an antireflection layer may be formed generally on the outside of the support layer to reduce light reflection.

In the context of this specification and the claims, the term "transfer layer" is used conventionally. The transfer layer serves to hold transferable material. In a typical donor element, there is at least one layer included in the transfer layer; and more than one layer can make up the transfer layer. The transfer layer has an inner side and an outer side. The outer side of said transfer layer is placed adjacent to a receiver element of an imageable assemblage for image-wise transfer by radiation. Transfer layers can include any suitable material or materials that are disposed in one or more layers with or without a binder that can be selectively transferred. The transfer can occur as a unit, in portions or in part by any suitable transfer mechanism. The transfer occurs when the assemblage is exposed to exposing radiation that can be absorbed by the absorbers in the assemblage and at least some portion of the electromagnetic energy of the radiation is converted into heat. In image-wise transfer, the transferred material need not be the entire mass of the transfer layer. Components of the transfer layer in a single portion may be selectively transferred to the receiver element while other components are retained with the donor element (e.g. a sublimable dye may transfer while a heat resistant crosslinked polymer matrix holding the dye may remain untransferred).

The transfer layer may be of any thickness, which remains functional for transfer to the receiver element and to fulfill the necessary function on the imaged receiver element or the donor element. Typical thickness of a transfer layer may be from about 0.1 µm to about 20 µm; for example, 0.2, 0.5, 0.8, 1, 2, 4, 6, 8, 10, 15, or 20 µm.

The transfer layer may include multiple components including organic, inorganic, organometallic, or polymeric materials. Examples of materials that can selectively patterned from donor elements as transfer layers and/or as materials incorporated in transfer layers include colorants (e.g., pigments and/or dyes dispersed in a binder), polarizers, liquid crystal materials, particles (e.g., spacers for liquid crystal displays, magnetic particles, insulating particles, conductive particles), emissive materials (e.g., phosphors and/or organic electroluminescent materials), non-emissive materials that may be incorporated into an emissive device (for example, an electroluminescent device) hydrophobic materials (e.g., partition banks for ink-jet receptors), hydrophilic materials, multilayer stacks (e.g., multilayer device constructions such as organic electroluminescent devices), microstructured or nanostructured layers, etch-resist, metals, materials having a metal component, polymers, adhesives, binders, and bio-materials, and other suitable materials or combination of such materials.

The transfer layer can be applied by coating onto the support layer, or other suitable donor element layer adjacent to the support layer. The transfer layer or its precursor may be applied by any suitable technique for coating a material such as, for example, bar coating, gravure coating, extrusion coating, vapor deposition, lamination and other such techniques. Prior to, after, or simultaneously with coating, a cross-linkable transfer layer material or portions thereof may be crosslinked, for example by heating, exposure to radiation, and/or exposure to a chemical curative, depending upon the material.

In one embodiment, the transfer layer includes material that is useful in display applications. Thermal transfer according to the present invention can be performed to pattern one or more materials on a receiver element with high precision and accuracy using fewer processing steps than for photolithography-based patterning techniques, and thus can be especially useful in applications such as display manufacture. For example, transfer layers can be made so that, upon thermal transfer to a receiver element, the transferred materials form color filters, black matrix, spacers, barriers, partitions, polarizers, retardation layers, wave plates, organic conductors or semi-conductors, inorganic conductors or semi-conductors, organic electroluminescent layers, phosphor layers, organic electroluminescent devices, organic transistors, and other such elements, devices, or portions thereof that can be useful in displays, alone or in combination with other elements that may or may not be patterned in a like manner.

In particular embodiments, the transfer layer can include a colorant. Pigments or dyes, for example, may be used as colorants. In one embodiment, pigments having good color permanency and transparency such as those disclosed in the NPIRI Raw Materials Data Handbook, Volume 4 (Pigments), are used. Examples of suitable transparent colorants include Ciba-Geigy Cromophtal Red A2B®, Dainich-Seika ECY-204®, Zeneca Monastral Green 6Y-CL®, and BASF Heliogen Blue L6700®. Other suitable transparent colorants include Sun RS Magenta 234-007®, Hoechst GS Yellow GG 11-1200®, Sun GS Cyan 249-0592®, Sun RS Cyan 248-061, Ciba-Geigy BS Magenta RT-333D®, Ciba-Geigy Microlith Yellow 3G-WA®, Ciba-Geigy Microlith Yellow 2R-WA®, Ciba-Geigy Microlith Blue YG-WA®, Ciba-Geigy Microlith Black C-WA®, Ciba-Geigy Microlith Violet RL-WA®, Ciba-Geigy Microlith Red RBS-WA®, any of the Heucotech Aquis II® series, any of the Heucosperse Aquis III series, and the like. Another class of pigments than can be used for colorants in the present invention is the various latent pigments such as those available from Ciba-Geigy. Transfer of colorants by thermal imaging is disclosed in U.S. Pat. Nos. 5,521,035; 5,695,907; and 5,863,860 and is herein incorporated by reference.

In some embodiments, the transfer layer can include one or more materials useful in emissive displays such as organic electroluminescent displays and devices, or phosphor-based displays and devices. For example, the transfer layer can include a crosslinked light emitting polymer or a crosslinked charge transport material, as well as other organic conductive or semi-conductive materials, whether crosslinked or not. For organic light emitting diodes (OLEDs) that are polymeric, it may be desirable to crosslink one or more of the organic layers to enhance the stability of the final OLED device. Crosslinking one or more organic layers for an OLED device prior to thermal transfer may also be desired. Crosslinking before transfer can provide more stable donor media, better control over film morphology that might lead to better transfer and/or better performance properties in the OLED device, and/or allow for the construction of unique OLED devices and/or OLED devices that might be more easily prepared when crosslinking in the device layer(s) is performed prior to thermal transfer.

Examples of light emitting polymers include poly(phenylenevinylene)s (PPVs), poly-para-phenylenes (PPPs), and polyfluorenes (PFs). Specific examples of crosslinkable light emitting materials that can be useful in transfer layers of the present invention include the blue light emitting poly(methacrylate) copolymers disclosed in Li, et al., Synthetic Metals 84, pp. 437-438 (1997), the crosslinkable triphenylamine derivatives (TPAs) disclosed in Chen, et al., Synthetic Metals 107, pp. 203-207 (1999), the crosslinkable oligo- and poly (dialkylfluorene)s disclosed in Klarner, et al., Chem. Mat. 11, pp. 1800-1805 (1999), the partially crosslinked poly(N-vinylcarbazole-vinylalcohol) copolymers disclosed in Farah and Pietro, Polymer Bulletin 43, pp. 135-142 (1999), and the oxygen-crosslinked polysilanes disclosed in Hiraoka, et al., Polymers for Advanced Technologies 8, pp. 465-470 (1997).

Specific examples of crosslinkable transport layer materials for OLED devices that can be useful in transfer layers of the present invention include the silane functionalized triarylamine, the poly(norbornenes) with pendant triarylamine as disclosed in Bellmann, et al., Chem. Mater. 10, pp. 1668-1678 (1998), bis-functionalized hole transporting triarylamine as disclosed in Bayerl, et al., Macromol. Rapid Commun. 20, pp. 224-228 (1999), the various crosslinked conductive polyanilines and other polymers as disclosed in U.S. Pat. No. 6,030,550, the crosslinkable polyarylpolyamines disclosed in International Publication WO 97/33193, and the crosslinkable triphenyl amine-containing polyether ketone as disclosed in Japanese Unexamined Patent Publication Hei 9-255774.

Light emitting, charge transport, or charge injection materials used in transfer layers of the present invention may also have dopants incorporated therein either prior to or after thermal transfer. Dopants may be incorporated in materials for organic light emitting diodes (OLEDs) to alter or enhance light emission properties, charge transport properties and/or other such properties.

Thermal transfer of materials from donor sheets to receiver elements for emissive display and device applications is disclosed in U.S. Pat. Nos. 5,998,085 and 6,114,088, and in PCT Publication WO 00/41893.

The transfer layer can optionally include various additives. Suitable additives can include light absorbers such as IR absorbers, UV absorbers, or visible light absorbers; dispersing agents, surfactants, stabilizers, plasticizers, crosslinking agents and coating aids. The transfer layer may also contain a variety of additives including but not limited to dyes, plasticizers, UV stabilizers, film forming additives, and adhesives. Suitable light absorbers for the transfer layer, and their conditions of use, are the same as those discussed in the section on the optional light-to-heat conversion layer.

It is typical for a transfer layer with a binder that any polymers of the binder do not undesirably self-oxidize, decompose or degrade at the temperature achieved during the heat exposure so that the exposed areas of the transfer layer are undamaged. Examples of suitable binders include styrene polymers and copolymers, including copolymers of styrene and (meth)acrylate esters and acids, such as styrene/methyl-methacrylate and styrene/methyl-methacrylate/acrylic-acid, copolymers of styrene and olefin monomers, such as styrene/ ethylene/butylene, and copolymers of styrene and acrylonitrile; fluoropolymers; polymers and copolymers of (meth) acrylic acid and the corresponding esters, including those with ethylene and carbon monoxide; polycarbonates; polysulfones; polyurethanes; polyethers; and polyesters. The monomers for the above polymers can be substituted or unsubstituted. Mixtures of polymers can also be used. Other suitable binders include vinyl chloride polymers, vinyl acetate polymers, vinyl chloride-vinyl acetate copolymers, vinyl acetate-crotonic acid copolymers, styrene maleic anhydride half ester resins, (meth)acrylate polymers and copolymers, poly(vinyl acetals), poly(vinyl acetals) modified with anhydrides and amines, hydroxy alkyl cellulose resins and styrene acrylic resins.

In one embodiment of the invention, the donor element is a support layer of polyethylene terephthalate, ca. 50 microns thick, coated with a transfer layer in an aqueous carrier and dried to give a transfer layer thickness of ca. 2.5 microns. Suitable transfer layers in an aqueous carrier were made from 37-55 dry parts by weight of a first styrene-acrylic copolymer with carboxylic acid content of 3.6 mM/g and weight average molecular weight about 10,000 atomic mass units, 30-55 dry parts of one or more pigment dispersions with pigment to binder ratio of 1.5-4:1 by weight, 0-6 dry parts of a second styrene-acrylic copolymer with carboxylic acid content of 3.6 mM/g and weight average molecular weight about 4000, 6-10 dry parts of carboxylic acid crosslinker, 1-1.5 dry parts of near-IR-absorbing dye 2-[2-[2-Chloro-3[2-(1,3-dihydro-1, 1dimethyl-3-(4-dimethyl-3-(4-sulfobutyl)-2H-benz[e]indol-2-ylidene)ethylidene]-1-cyclohexen-1-yl]ethenyl]-1,1-dimethyl-3-(sulfobutyl)-1H-benz[e]indolium, inner salt, free acid, CAS # [162411-28-1] peak absorbance about 850 nM, from H. W. Sands and Co., Jupiter, Fla., 0.5 parts surfactant, and 0.5 parts defoaming agent.

In the context of this specification and the claims, the term "receiver element" is used conventionally. The receiver element is the object that accepts the transfer of material from the transfer layer according to the pattern of exposing. The receiver element may consist of any object, typically a sheet-like object, for example a single layer, or a multi-layer element. There is no particular limitation on the materials suitable for employment in the receiver except that the receiver is capable of retaining the transferred image and that it be reasonably dimensionally stable. The receiver element can comprise a dimensionally stable sheet material or a rigid object. The assemblage can be exposed through the receiver element if that element is sufficiently transparent. Examples of transparent films for receiver elements include, for example polyethylene terephthalate, polyether sulfone, a polyimide, a poly (vinyl alcohol-co-acetal), polyethylene, or a cellulose ester, such as cellulose acetate. Examples of opaque receiver element materials include, for example, polyethylene terephthalate filled with a white pigment such as titanium dioxide, ivory paper, or synthetic paper, such as Tyvek® spunbonded polyolefin. Paper supports are typical and are preferred for proofing applications, while a polyester support, such as polyethylene terephthalate is typical and is preferred for a medical hardcopy and color filter array applications. Roughened supports may also be used in the receiver element A rigid object such as a sheet of glass or a glass color filter substrate can also be the receiver element. The receiver element can comprise one or more instances of layers such as a receiving layer, a deformable layer, a release layer, and a receiver support layer. Other useful receiver element components are also disclosed in U.S. Pat. No. 5,534,387 issued on Jul. 9, 1996.

Receiver elements may be any type of substrate or display element or precursor suitable for display applications. Receiver elements suitable for use in displays such as liquid crystal displays or emissive displays include rigid or flexible substrates that are substantially transmissive to visible light. Examples of rigid receiver elements include glass, indium-tin oxide coated glass, low temperature polysilicon (LTPS), and rigid plastic. Suitable flexible substrates include substantially clear and transmissive polymer films, reflective films, non-birefringent films, transflective films, polarizing films, multilayer optical films, and the like. Suitable polymer substrates include polyester base (e.g., polyethylene terephthalate, polyethylene naphthalate), polycarbonate resins, polyolefin resins, polyvinyl resins (e.g., polyvinyl chloride, polyvinylidene chloride, polyvinyl acetals, etc.), cellulose ester bases (e.g., cellulose triacetate, cellulose acetate), and other conventional polymeric films used as supports in various imaging arts. Transparent polymeric film base of from about 2 to about 200 mils (i.e., 0.05 to 5 mm) is preferred.

For glass receiver elements, a typical thickness is about 0.2 to 2.0 mm. It is often desirable to use glass substrates that are about 1.0 mm thick or less, or even 0.7 mm thick or less. Thinner substrates result in thinner and lighter weight displays. Certain processing, handling, and assembling conditions, however, may suggest that thicker substrates be used. For example, some assembly conditions may require compression of the display assembly to fix the positions of spacers disposed between the substrates. The competing concerns of thin substrates for lighter displays and thick substrates for reliable handling and processing can be balanced to achieve a preferred construction for particular display dimensions.

If the receiver element is a polymeric film, it may be preferred that the film be non-birefringent to substantially prevent interference with the operation of the display in which it is to be integrated, or it may be preferred that the film be birefringent to achieve desired optical effects. Exemplary non-birefringent receiver elements are polyesters that are solvent cast. Typical examples of these are those derived from polymers consisting or consisting essentially of repeating, interpolymerized units derived from 9,9-bis-(4-hydroxyphenyl)-fluorine and isophthalic acid, terephthalic acid or mixtures thereof, the polymer being sufficiently low in oligomer (i.e., chemical species having molecular weights of about 8000 or less) content to allow formation of a uniform film. This polymer has been disclosed as one component in a thermal transfer receiving element in U.S. Pat. No. 5,318,938, herein incorporated by reference. Another class of non-birefringent substrates are amorphous polyolefins (e.g., those sold under the trade designation ZEONEX from Nippon Zeon Co., Ltd.). Exemplary birefringent polymeric receiver elements include multilayer polarizers or mirrors such as those disclosed in U.S. Pat. Nos. 5,882,774 and 5,828,488, and in International Publication No. WO 95/17303, all herein incorporated by reference.

In the context of this specification and the claims, the term "assemblage" is used conventionally. For example, an assemblage comprises a receiver element and a donor element, aligned with the transfer layer adjacent the receiver element. The donor element and receiver element are brought into contact or intermittent contact and typically held together by a force in an assemblage.

Vacuum and/or pressure can be used to hold the donor element (10) and the receiver element (40) together to form the assemblage. A vacuum table provides a convenient method to form an assemblage and position it for exposing. In one embodiment, the receiver element is placed on a vacuum table and a wider and longer donor element is positioned to completely cover the receiver element and overlap onto the vacuum table. The vacuum table draws air from between the donor element and the receiver element until the atmospheric pressure between the two elements is low and they are drawn together. A roller can be used to push trapped air bubbles away to the outer edges of the receiver element where the air bubbles are drawn away by the vacuum. Typically this evacuation brings the transfer layer outer surface and the outer surface of the receiving element into contact, unless for example a mask or target intervenes. If each surface of the elements is smooth, the contact can be intimate and continuous over a large area. If either surface is not smooth enough, the contact can be intermittent. For example, a roughened surface on either element can be present to avoid trapped air bubbles, and the roughening can prevent continuous contact. A previously imaged receiver element having protruding areas of transfer layer from a previous imaging can prevent the donor element from conforming completely to the topography of the receiver element. An inherently non-planar receiver element such as a color filter array of a glass substrate bearing a black mask defining window elements can also prevent the donor element from conforming completely to the topography of the receiver element.

As one alternative, the assemblage can held together by fusion at the periphery. As another alternative, the assemblage can be held together by taping the donor and receiver element together and the assemblage is then taped to the imaging apparatus, or a pin/clamping system can be used. As yet another alternative, the donor can be laminated to the receiver element to form an assemblage. The assemblage can be conveniently mounted on a drum to facilitate laser exposing. Those skilled in the art will recognize that a variety of architectures such as flatbed, internal drum, capstan drive, etc. can also be used with this invention.

In the context of this specification and the claims, the term "exposing" is used conventionally. For example, imaging involves a form of exposing. Light is a form of radiation that is electromagnetic in character and is used for exposing. The use of radiation for exposing is given above.

In the context of this specification and the claims, the term "separating" is used conventionally. For example, when the entire spent donor element is separated from the imaged receiver element, all contact of the transfer layer of the donor element with the receiver element is lost. The forces holding together the assemblage are removed or overcome during separating. It is possible after separation to form a new assemblage, typically with a new donor element to continue a functionalization of an original receiver element with multiple different transfer layers placed at typically different locations.

In the context of this specification and the claims, the term "treating" is used for an inventive manipulation of an exposed assemblage that occurs prior to separation. Treating can encompass treatment of an entire assemblage or a portion of an assemblage, or portionwise treatment of an entire assemblage. In one embodiment, treatment of some portions of an assemblage may be incomplete or unstarted, while other portions are already treated but not separated, and still other portions are already treated and separated, and some still other portions are separated without treatment.

In the context of this specification and the claims, the term "relative movement" is used conventionally. For example, when the support layer and receiver element undergo relative movement, they undergo different amounts of movement, or movement in different directions. The difference in amount can be small; for example, less than 0.01 microns, 0.1 micron, 1 micron, 3 microns, or 10 microns; and the difference in direction can be small, for example less than 0.001 radians, 0.01 radians, or 0.1 radians.

In the context of this specification and the claims, the term "substantially parallel" to a reference is used conventionally. By substantially parallel we mean a direction that when resolved into at most two orthogonal vectors of direction including one vector parallel to the reference, for example the support layer (meaning the support layer surface adjacent the receiver element), and another optional vector perpendicular to the one vector, that the one vector is as large or larger than the other orthogonal vector.

In the context of this specification and the claims, the term "adhesive" and "adhesive surface" are used conventionally.

The adhesive surface sticks, preferably temporarily and without leaving a residue, to an object brought into contact. A simple test qualifies a surface as adhesive; a polyethylene terephthalate strip is adhered to a defined roller bearing the adhesive surface, and the strip is removed from the adhesive surface under specified conditions; if the time for removal exceeds a threshold, the surface is adhesive. For materials not easily tested as herein, comparison can easily be made as to relative adhesivity of an untestable material to a testable appropriate material to determine which adheres more or equally tenaciously to the support layer of an assemblage, and therefore has equal or higher adhesivity so as to be appropriate.

The test to demonstrate the presence and stickiness of an adhesive is conducted at a temperature of around 23 C (73 F) and with the relative humidity around 40 percent. The adhesive is obtained on a roller having a diameter of 1 to 40 cm. A roller, for example roller, bears the adhesive on its outer surface, and is aligned horizontal so that one circular end of the immobilized roller can be observed for the presence of a strip. A strip of polyethylene terephthalate having an untreated side is used to test the adhesivity. The strip measures 50 microns (2 mil) thick by 25 mm wide by 560 mm long. One 25 mm edge of the strip is placed on the horizontal roller near the observed end at the 12 o'clock position of the observed circular end, the 25 mm edge being parallel to the conventional rotational axis of the fixed roller so as to allow the strip to be wound once (lengthwise and straight, without spiraling or wrapping multiple laps over the circumference) onto the roller counter-clockwise. The strip is wound only once around the roller so as to adhere to the roller at all positions, starting at 12 o'clock, covering the 11, 10, 9, . . . 2, and 1 o'clock positions, and returning to the 12 o'clock position from the perspective of the viewer of the observed end of the roller. The loose end of the strip is turned back upon itself, while held without pulling on the adhered portion, and weighted at the end of the strip with a 17 g weight (for example, small metal binder clips). The dangling weighted unadhered portion of the strip is positioned so as to be able to contact the outside of the adhered strip, e.g. at the 1, 2, and 3 o'clock positions, before hanging free.

The adhesiveness test commences with smoothly allowing the weighted position of the strip to hang freely without jerking or swaying and by the weight and weighting of the strip hanging down, thereby beginning delaminating the strip from the immobile roller, uncovering in order from the 12 o'clock position, the 1, 2, 3, 4, 5, 6, 7, etc. o'clock positions. The time (e.g. in seconds) from the start (uncovering the 12 o'clock or uppermost position) to uncovering the 6 o'clock (lowermost) position measures the raw adhesiveness value. The uncovering will continue after the 6 o'clock position is uncovered.

The raw time for the half circumference length uncovered is converted to a time necessary to uncover a 50 mm length at the same average velocity, to give the test result as an adhesiveness time expressed in seconds unless otherwise indicated. In other words, the final value of adhesiveness is the same as the raw value if the roller had a circumference of 10 cm; in other words a proportion is made to report the value as if the unrolling uncovered a 5 cm length of adhesive at a rate proportionate to the actual roller. If a roller with an 8 cm diameter and a 25.13 cm circumference has a raw adhesiveness value of 80.0 seconds for unrolling the polyethylene terephthalate strip from the 12 o'clock to 6 o'clock position, the reported (normalized) adhesiveness value is 31.8 seconds.

Higher values of time for the uncovering indicate greater adhesiveness. The surface is considered sufficiently adhesive if the time to uncover from 12 to 6 o'clock, proportioned to 50 mm is greater than 2 seconds. In certain embodiments, the time is greater than a selection of the times including 3, 5, 10, 20, 60, 90, 120, 200, and 400 seconds, each value of which constitutes another embodiment of an adhesive surface. In the case that the roller is non-adhesive, the strip will unwind from the 12 to 6 o'clock positions in 2 seconds or less, typically in 1 second or less. In most cases, the non-adhesivity of a material is obvious by inspection, and no test is necessary, but in borderline cases the test may be applied.

In the context of this specification and the claims, the term "compliant" is used to describe a material having a hardness of less than or equal to 90 on the Shore A scale of hardness as defined by ASTM D2240-00, allowing for the measurement to be taken on the roller as necessary. We speculate without limiting the invention to such embodiments that lower durometer values improve the frictional contact of the treating apparatus with the support layer of the assemblage and improve the coupling of movements of the treating apparatus into movements of the support layer; however it is not required that this occur for the invention to operate. Preferred and more preferred durometer readings include those below 80, below 70, below 60, below 50, below 40, below 30, below 20, and below 10.

In the context of this specification and the claims, the term "adhesive compliant surface" is used conventionally. An adhesive compliant surface has a maximum Shore A scale compliance noted herein for a compliant material (<90 on the Shore A scale), and is adhesive (adhesiveness unroll time of >2 seconds). Preferred are adhesive compliant treaters with a Shore A durometer of less than 60 and a adhesiveness unroll time of greater than 10 seconds, especially rollers. In the context of this specification and the claims, the term "roller" is used conventionally. Rollers are typically cylindrical, and contact an assemblage on the curved surface of the roller. Rollers are typically manipulated by their central axis. Rollers may be freely rotated or driven.

A driven roller can easily provide a shearing movement to an assemblage. Driving can produce a rotation speed more or less than the freely rotated speed derived from moving across the assemblage, momentarily during the initiation of the driving, or continuously during the driving with skidding occurring. A roller can contact an assemblage with no closing force ("kissing"), or a positive force ("pressing"), or a negative force (for example in the case that the roller is adhered to an assemblage but subjected to a lifting force away from the assemblage).

In the context of this specification and the claims, the term "colorless" and "colored" are used conventionally. Color refers to various changed distributions of visible light that can reach an observer, in comparison to visible "white" light. When no or negligible light from an object reaches an observer, an object is termed black. When a diminished intensity of light from an object with the same relative amounts of various wavelengths as ambient "white" light reaches an observer, the object or light is said to be colorless or grey. When light from an object differs in relative intensity at various visible wavelengths from ambient "white" light, the object or light is said to be colored. For example, when the only light reaching an observer from an object is from long wavelengths of the visible spectrum, the object or light is said to be red.

In the context of this specification and the claims, the term "transparent" is used conventionally. Transparent refers to the quality that allows transmission of at least some visible light through an object without substantial scattering. Transparent objects can be colored or colorless. If substantial scattering occurs, the object can be termed translucent or opaque.

In the context of this specification and the claims, the term "black matrix" is used conventionally. In a color filter, a black matrix blocks light where present, and is typically used on a transparent and optionally colored substrate. Black matrices can be added to color filters before or after colored transparent filters are added. In one embodiment, a black matrix helps prevent light from one full color cell or single color pixel from leaking to another cell or pixel. Metallic or metallic oxide coating such as chromium or chromium oxide or pigments such as carbon black, optionally in binders, can be used as a black matrix material, and matrix definition can be carried out by photolithography or by thermal transfer.

EXAMPLES

The following are examples of embodiments of the invention and comparative examples to illustrate the advantages of the invention. It should be understood that the invention is not limited to these embodiments, as alternative embodiments are given in the specification and are readily apparent to those of normal skill.

A suitable partially completed color filter receiver element for these examples is a "fourth generation" 920 mm long by 730 mm wide by 0.7 mm thick glass receiver substrate (Corning Glass Company, Corning, N.Y.), with two black matrices approximately 713 mm wide by 401 mm long by 0.001 mm thick, each black matrix comprising a binder and carbon black pigment. The black matrix has a rectangular pattern of nearly rectangular openings exposing the glass, the pattern having 1366×3=4098 openings in the wide direction (across columns) and 768 openings in the long direction (across rows) for a total of 3,147,264 openings. Each nearly rectangular opening is approximately 0.492 mm long and 0.144 mm wide, separated from neighboring openings by a portion of black matrix approximately 0.03 mm wide or long. In one type of partially finished color filter, each third column of openings (1366 columns of the 4098) is covered by a stripe of blue pigmented polymer approximately 401 mm long by 0.154 mm wide by 0.002 mm thick that overlaps onto the black matrix separating the column from a neighboring column by approximately 0.005 mm, and completely covers the portion of black matrix separating the openings in the same column. These blue stripes were placed on the glass support and black matrix, in these examples using thermal transfer with a transfer layer comprising a blue pigment and a polymer, although other methods such as photolithographic techniques could have been used to add the blue layer. A similar set of red stripes can cover another 1366 columns, immediately adjacent the blue stripes on one side. More than one design of actual receiver elements were used in these examples, but any differences are insignificant to the invention.

The donor element used was typically a polyethylene terephthalate film support layer at least 1000 mm long by at least 800 mm wide by approximately 0.05 mm thick having on one side an approximately 0.002 mm thick colored pigmented (often green, but the results with blue, or red are unchanged) transfer layer comprising a polymeric binder, a near infrared absorbing dye, and a pigment. A thin (<0.0005 mm) light-to-heat conversion layer comprising a near infrared absorbing dye and a binder is optional between the support layer and the transfer layer.

A level horizontal vacuum table held the assemblage of a suitable partially completed color filter receiver element and a colored donor element, aligned with the partially completed color filter receiver element centered between the colored donor element and the vacuum table with the blue pigmented polymer transferred layer and optional red pigmented polymer transferred layer in contact with the colored transfer layer. The uncoated flat glass surface of the receiver element is located on the vacuum table. The vacuum table was capable of maintaining a reduced air pressure of less than or equal to about 10,000 Pa (0.1 atmosphere). Around the entire perimeter of the receiver element the longer and wider donor element directly contacted the vacuum table and thus allowed air to be drawn out from between the two elements, bringing into contact at least portions of the blue pigmented polymer layer of the receiver element and the colored transfer layer.

The image-wise exposing of the assemblage utilized a laser head moving relative to the assemblage at approximately 1 meter per second in a direction parallel to the long edge of the blue pigmented polymer stripes at a fixed distance above the assemblage while emitting approximately 830 nm laser radiation from small abutted laser beam pixels at an intensity of approximately 450 mJ per square centimeter for an exposure time of about 4 milliseconds in a given area of the assemblage. Between scans the laser head was translated relative to the assemblage by an appropriate amount so that all necessary radiation exposure of the wide and long assemblage was accomplished by a shorter and narrower laser head.

The scans served to transfer stripes of colored (green, or red) pigmented transfer layer into association with the receiver element, one stripe each over each column of windows between a column of windows covered by a blue stripe and a column of windows covered by a red stripe if present. The alignment of the colored stripes over the column of windows and the adjoining black matrix defining the windows was exactly analogous to the blue stripes over their corresponding column of windows.

The laser radiation was directed at the assemblage through the polyethylene terephthalate support layer of the donor element towards the green (or red, etc.) transfer layer, essentially perpendicularly to the support layer.

One method of separating of the assemblage utilized in these examples was a vacuum-equipped take-up roller (a method termed "rollered peeling"). The roller (approximately 226 cm (89 inches) long, with a 8 cm (3 inch) diameter) included rows of vacuum holes spaced along its width at one location of its circumference in order to hold the support layer to the roller by vacuum. (Unless otherwise stated, all rollers used in these examples are approximately 226 cm (89 inches) long, with a 8 cm (3 inch) diameter.)

The roller was lowered to contact the polyethylene terephthalate film support layer of the imaged donor element opposite the vacuum table away from the receiver element along the 800 mm width of the spent donor element, so that the vacuum holes of the roller held the support layer. The roller was then rolled towards and over the receiver element so as to lift the spent donor element off the imaged receiver element and wrap it around the roller, so that eventually more than one lap of spent donor element was wound onto the roller. The direction of rolling was parallel to the long edges of the stripes and the fast direction of movement of the laser head.

During most of this rolling (except near the finish when donor element is wound off the vacuum table after the receiver element is completely uncovered), the vacuum table was still removing air from between the spent donor element and the imaged receiver element. The resulting force from the atmospheric pressure on the donor element above the assemblage tended to close the separation between the donor and receiver elements and kept the elements generally fixed relative to one another by friction resisting any movement such as sideways or separating movements, until the roller separated the elements.

The continued use of the vacuum table also prevented the roller from pulling the entire donor element across the receiver element towards the roller during separation. The spent donor element thus wound onto the roller synchronously with the travel of the roller across the receiver element, and not more rapidly as could have happened if the spent donor element moved across the receiver element towards the roller.

A second method of separating the spent donor element from the imaged receiver element was manual removal by peeling. In this case, an edge of the spent donor element held on the vacuum table was bent upwards. Continued elevation of the edge lead to a line of separation moving towards and ultimately over the imaged receiver element. The line of separation was as nearly as possible made to travel parallel to the direction of rapid travel of the laser head.

Grazing illumination with an intense collimated wide short beam of white light was unused for macroscopic inspection of the separated imaged receiver element. A suitable light source is a Line Light (36", 24 volt DC, Model LL17436-WHI24) by Advanced Ilumination Company of Rochester, Vt. Two lights can be used to illuminate from opposite directions or different directions. In this inspection, height irregularities of transferred pigmented layers are observed as different color intensities-when colored layer juts up, as for a flap, an intense area of that color is seen due to illumination, reflection, and scattering. Typically, the uniform heights found for the first layer (the blue layer often) gives a uniform (blue), not very intense appearance to those areas. However, the green areas of the receiver element can show different intensity depending on whether or not green transfer layer sticks up from the receiver element to reflect the grazing light upward. The receiver element shows a low intensity green color when the connectors of green transfer layer break close to the green transfer layer associated with the receiver element and rough and elevated edges are absent. The stripe edge in that area resembles a blue stripe edge and is very straight when examined under a microscope. The green areas of the receiver area shows a high intensity green color when the connectors of green transfer layer break closer to and at the green transfer layer associated with the donor element, leaving a wider stripe of green transfer layer on the receiver element with an upturned edge that is illuminated by the white light.

Macroscopically, the areas of low intensity green color and high intensity green color can transition suddenly and have distinct well defined borders rather than a mixed region. The color that is detected by the eye when multiple colors have reflecting edges present can vary because the eye has different sensitivity to the different colors. The presence of upturned edges will usually make that color readily apparent. Microscopically the areas of high intensity green color show a mixture of wide lines having edges of attached connectors and narrow lines not having attached connectors. The areas of low intensity green color show almost exclusively narrow lines not having attached connectors.

In each evaluation, the edges of the color stripe transferred from the donor element in the assemblage (green or red) is noted, and rated, particularly to the blue color stripes that often show much superior edges with minimal flaps attached to the transferred material from the transfer layer onto the receiver element.

Each example below used as receiver element a suitable partially completed color filter comprising glass and a black matrix very similar to that described above, already containing one (blue) or two color (blue and red) filter layers over the appropriate transparent windows, and used a donor element of another color not yet on the receiver element (red or green respectively). Exposure of the assemblage was carried out to lay down a pattern of color filter stripes covering one third of the total windows (either half or all of the remaining appropriate windows). Treating and separating of the assemblage after exposing was carried out as recorded below.

Comparative Example 1

This example shows a result of exposure and separation without a treating step.

The assemblage used was a receiver element of a color filter glass sheet with an organic black mask, functionalized by thermal mass transfer with blue filters and red filters, and a donor element with a green pigmented transfer layer suitable for transferring green filters. The assemblage was imagewise exposed and separated into a green-filter imaged receiver element and a spent donor element by roller peeling with the 8 cm diameter roller moving at a forward speed of 27.5 cm per second while wrapping spent donor around the roller. During the separation step, the vacuum table continued to remove air from the assemblage; vacuum was broken progressively down the assemblage as the separation proceeded when the spent donor element was lifted away from the imaged receiver element.

Macroscopic examination (using grazing illumination in all cases unless otherwise specified) of the imaged receiver element after separation showed mostly high intensity green areas with a few randomly scattered low intensity green areas, given a macroscopic rating of 1 (1=bad; almost no or no scattered low intensity green areas, 10=excellent with all or nearly all low intensity green areas). Microscopic examination of the imaged receiver element showed a random distribution of imaged areas of green transfer layer having and not having flaps at the edges of the areas, showing rough edges, given a microscopic rating of 1 (1=bad; debris and mixed edges, 10=excellent, no connectors or debris on receiver element).

The proportion of edges of images where the connector was predominantly on the donor element was estimated to be low, less than 20%.

Example 2

This example shows a result of exposing, treating, and separating with a compliant, adhesive roller.

The assemblage used was a receiver element of a color filter glass sheet with an organic black mask, functionalized by thermal mass transfer with blue filters and red filters, and a donor element with a green pigmented transfer layer suitable for transferring green filters. The treating used a roller with a diameter of 8 cm, rolled over the support layer of the donor element of the assemblage at 5 cm per second for a distance of 2 m while an apparent atmospheric pressure of about 10,000 Pa was maintained in the assemblage on the vacuum table.

The 8 cm diameter roller was made up of a hollow steel cylinder with an inner diameter of 5 cm and an outer diameter of 6 cm. The hollow steel cylinder was covered with a 1 cm thickness of rubbery adhesive material referred to as "Super Polyurethane". The Shore durometer (A scale unless otherwise specified; as in ASTM D2240-00) of the outer material was 20. The adhesiveness measurement (time to uncover from 12 to 6 o'clock) was approximately 130 seconds. The roller weighs approximately 21 kg (46 lbs) and is approximately 226 cm (89 inches) long. Polymag Tek Inc., Rochester, N.Y., supplied the roller.

The roller was moved forward with a force downwards towards the assemblage of approximately 21 kilopascals (3 psi). After completion of treating, the assemblage rested on the evacuated vacuum table more than 10 seconds before separating began. The separation was performed as in Comparative Example 1.

Macroscopic quality of the imaged receiver after separation was rated 8 (1=bad, 10=excellent) and was quite consistent; there was minimal intense green area seen; among the intense green areas observed were some within 2 cm of the edges of the imaged area. Microscopic examination of the imaged receiver showed a greatly increased distribution of imaged areas of green transfer layer having no flaps in comparison to those edges having flaps.

Example 3

This example illustrates moving the support layer of the donor element with respect to the receiver element immobilized on the vacuum table. The effective movement was found to be a shearing movement performed by moving the position of the support layer from a first position to a second position relative to the receiver element along a direction substantially parallel to the support layer. The movement was especially effective when carried out parallel or perpendicular to the edges of the image.

An imaged assemblage was made from a blue-transfer-layer imaged color filter glass substrate with an organic black mask as the receiver element, and a red pigmented transfer layer donor element. The assemblage was made on the vacuum table of the exposing apparatus. The assemblage was exposed by a laser head while held on a vacuum table. The vacuum table maintained a lowered pressure of approximately 10,000 Pa in the assemblage during imaging and treatment.

The treatment was carried out by placing a weight onto the support layer of the donor layer of the assemblage and striking the side of the weight to move the weight along the surface of the support layer. By friction, this served to move the support layer with respect to the receiver element. Separately, numerous black-masked areas of the exposed assemblage were treated using the metal weight. Vacuum was maintained on the imaged assemblage during treatment.

The weight was steel, 2.54 cm (1 inch) by 18 cm (7⅛ inch) by 18 cm (7⅛ inch) with all edges meeting at 90 degrees, and weighed about 7.1 K (18 pounds). The weight was placed with a rectangular face (2.54 by 18 cm) on the support layer of the donor element of the assemblage. A rectangular face of the weight at 90 degrees to the face contacting the assemblage was then struck by a 3.2 Kg (8 lb) hammer, to drive the weight across the assemblage. Typically the weight moved about 1 cm, skidding across the assemblage somewhat. The weight was aligned in separate experiments on untreated areas of the assemblage parallel to the long edges of the colored images on the receiver element, and perpendicular to the long edges, and at a 45 and 135 degree angle, where 0 degrees is parallel to the long edges of the exposed stripes of red transfer layer in the direction the laser head was first moved parallel to the long edges. In separate experiments, the weight was struck on first one end to propel the weight, and then placed in a parallel position on an untreated section and struck on the second opposite end to propel the weight in the opposite and parallel direction. In each experiment, the weight was placed, struck once, and then lifted away from the area of treatment at least 5 minutes from the start of the separation step. A control placement and removal of the weight without striking showed a much smaller effect that was smallest away from the edges of the weight.

After treating 16 separate areas, the assemblage was separated by peeling by a take-up roller as in Comparative Example 1. During the entire time of exposing and treating of the assemblage, and up until the completion of peeling step, the evacuation of the assemblage by the vacuum table was used to hold the receiver element in one position, and to draw the donor element close to or in contact with the receiver element.

Grazing illumination of the separated imaged receiver element clearly showed a red/purple color in areas that were untreated, and a very obvious intense blue color within some of the areas treated. The blue color indicates a relative absence of red flaps, a desirable effect of the treating step carried out in some areas.

The grazing illumination of areas where the metal rectangle contacting the assemblage was parallel or perpendicular to the underlying line edges of the image and direction of laser movement used to make the image showed large amounts of intense blue areas, indicative of the absence of red elevated flaps being illuminated by the grazing light. The areas where the metal rectangle was at 45 or 135 degrees to the line edge, showed much less blue area. Notably, in some cases where the metal rectangle was at 45 degrees to the line edge, the location of the edge of the metal was blue. This may be due to the placement of the metal being not exactly metal surface to assemblage surface, but metal edge to assemblage surface, thus having an initial compression of the donor element towards the receiver element at the edge later be relieved by a tilting or righting of the metal face or the removal of the metal altogether.

The treatment types made in this example include moving the position of the support layer from a first position to a second position relative to the receiver element along a direction substantially parallel to the support layer, due to the striking of the hammer on the weight transferring a shearing movement to the support layer by friction; and by moving the position of the support layer from a first position to a second position relative to the receiver element along a direction toward the receiver element, followed by moving the position of the support layer from the second position to a third position relative to the receiver element along a direction away from the receiver element.

Figure 11:
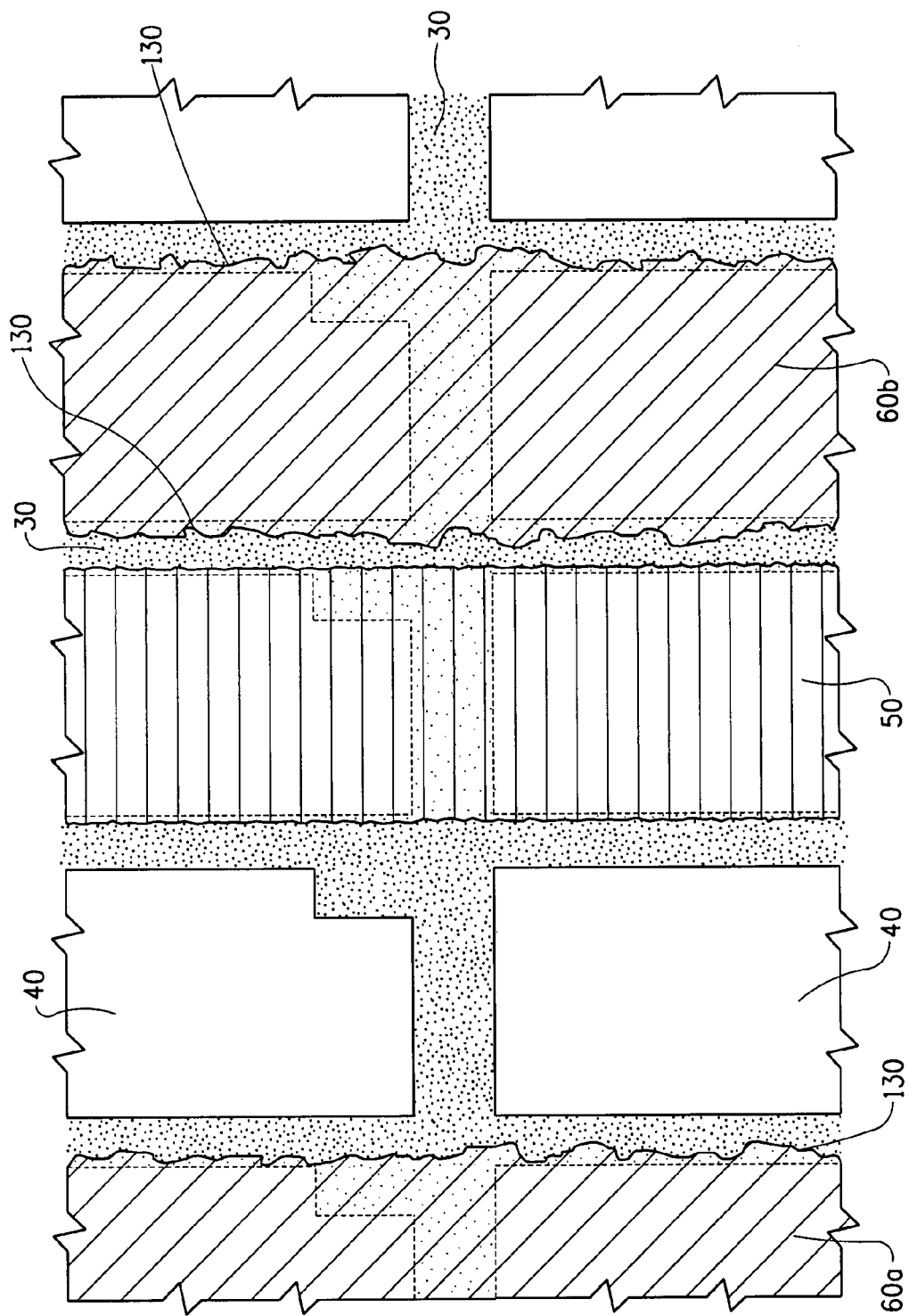
FIG. 11 is a top view of a three-color color filter during manufacture when two color filter stripes have been applied, one with a smooth edge and one with a rough edge.

FIG. 11 shows the amount of red flaps typically seen microscopically in a portion of a color filter exhibiting a bright appearance by grazing illumination for a region of the receiver element showing flaps. FIG. 11 shows black matrix (30), defining windows (40) looking through glass, one third of which are covered columnwise with a stripe of blue colored transparent transfer material (50), with a neighboring one third of the stripes covered by red colored transparent transfer material (60). This tracing from a photograph shows a blue stripe without significant apparent flaps covering black matrix between and surrounding two partially visible windows, each complete window being roughly rectangular with a rectangular intrusion of black matrix covering an area designated for thin film transistor placement visible on one. Each red stripe (60a, b) shows analogous coverage of the adjacent column of windows and separating black matrix, with addition fragments of flaps (130) of intense red extending out occasionally or in a majority of areas from the main body of the red stripe. This presence or absence of flaps gives the edge a rough appearance that was easily observed microscopically. However, in regions of the receiver element treated by the metal placement parallel or perpendicular to the line edges, the red and blue line edges were very similar in microscopic appearance, the red edges notably showing almost no sign of flaps and being very straight. Similar improvements in microscopic appearance occur when the macroscopic appearance improves when treating improves the line edges.

Example 4

This example used an adhesive tape to produce a movement of the support layer with respect to the receiver element held by the vacuum table. The experiment was analogous to the previous example using a metal plate, however the treating step was carried out by the application and removal of an adhesive tape.

The tape used was Polyken 781 splicing tape by Tyco Adhesives, Franklin, Ky. This blue tape is about 5 cm (2 inches) wide and 0.11 mm thick. It is a single coated tape of a silicone rubber adhesive on a polyester film carrier. The tape has excellent shear strength and is a very good adhesive. Adhesion to steel is 385 N/m by test method PSTC-1 (Pressure Sensitive Tape Council, Northbrook, Ill.).

An imaged assemblage was made from a blue-transfer-layer imaged color filter glass substrate with an organic black mask receiver element, and a red pigmented transfer layer donor element. The assemblage was held on a vacuum table and exposed by a laser head. Separately, numerous black-masked areas of the exposed assemblage were treated using sections of the adhesive tape.

The tape was placed on the assemblage over the areas exposed, in various orientations of the long edges of the tape with respect to the long edges of the exposed stripes (the exposed stripes being parallel to the fast direction of travel for the laser head). The various orientations were aligned as for the metal weight above: along the length of the long edges of the red stripes; perpendicular to the long edges of the red stripes, and at 45 and 135 degrees to the long edges of the red stripes. In each case separate applications of tape were peeled in opposite directions, and each treatment was duplicated.

In each instance, the tape was firmly placed in contact with the support layer of the assemblage and rested at least 15 seconds. The tape was then lifted away from the area of treatment covered by the tape by peeling up a short edge of the tape and peeling away the rest by bending the short edge fully backwards (a 180 degree bend) and pulling the tape so that the lengthening edges of the released tape are parallel and initially nearly touching the shortening edges of the remaining tape still adhered to the support layer of the assemblage.

After treating numerous separate areas, the assemblage was separated by peeling by a take-up roller as in Comparative Example 1. Since the assemblage was made and up until the completion of peeling step, the evacuation by the vacuum table was used to hold the receiver element in one position, and to draw the donor element close to or in contact with the receiver element.

Grazing illumination of the separated imaged receiver element clearly showed a red/purple color in areas that were untreated, and a very obvious intense blue color within some of the areas treated.

The grazing illumination of areas where the metal rectangle contacting the assemblage was parallel or perpendicular to the underlying line edges of the image and direction of laser movement used to make the image showed large amounts of intense blue areas, indicative of the absence of red elevated flaps being illuminated by the grazing light. The areas where the metal rectangle was at 45 or 135 degrees to the line edge showed much less blue area compared to the prevalence of red.

The treatment types made in this example include moving the position of the support layer from a first position to a second position relative to the receiver element along a direction substantially parallel to the support layer, due to the peeling of the tape at 180 degrees back upon itself transferring a shearing movement to the support layer by transferring the force necessary for peeling partially into movement of the support layer relative to the receiver element; and by moving the position of the support layer from a first position to a second position relative to the receiver element along a direction toward the receiver element, followed by moving the position of the support layer from the second position to a third position relative to the receiver element along a direction away from the receiver element during the application of the tape.

The appearance of the red edges in areas not treated by the tape was similar to the appearance of FIG. 11. The microscopic examination gave results similar to those of example 3.

Example 5

Example 5 was carried out identically to Example 4, with the exception that the removal of the adhesive tape from the support layer was done by pulling the tape up at 90 degrees from the surface of the support layer rather that parallel to the support layer. This removal means that the treating involves a motion of the support layer away from the receiver element, followed by a restoring movement of the support layer towards the receiver element after the tape removal is complete at a given location.

The appearance of the final separated receiver element in the regions treated showed very obvious changes by grazing illumination indicating less red edge flaps being illuminated than in areas where no treating was carried out. Microscopic examination showed that tape removal at 180 degrees was superior to tape removal at 90 degrees for eliminating microscopically visible flaps.

Example 6

This example shows a result of exposing, treating, and separating with a compliant roller used for treating.

The assemblage used was a receiver element of a color filter glass sheet with an organic black mask, functionalized by thermal mass transfer with blue filters and red filters, and a donor element with a green pigmented transfer layer suitable for transferring green filters.

The treating used a roller with a diameter of 8 cm, rolled over the support layer of the donor element of the assemblage at 5 cm per second for a distance of 2 m while an apparent atmospheric pressure of about 10,000 Pa was maintained in the assemblage on the vacuum table. The 8 cm diameter roller was made up of a hollow steel cylinder with an inner diameter of 5 cm and an outer diameter of 6 cm. The inner cylinder of the roller was filled with weighting material. The hollow steel cylinder was covered with a 1 cm thickness of green polyurethane. The Shore durometer (A scale unless otherwise specified; as in ASTM D2240-00) of the outer material was 23. The adhesiveness measurement was 1 second; this roller was not adhesive. The roller weighs 41 kg (91 lbs) and is approximately 226 cm (89 inches) long. The roller was supplied by Finzer Roller Inc, Des Plaines, Ill.

The roller was moved forward while maintaining a downward force on the assemblage of approximately 21 KPa (3 psi). After completion of treating, the assemblage rested on the evacuated vacuum table more than 10 seconds before separating began. The separation was performed as in Comparative Example 1.

Macroscopic quality of the imaged receiver element after separation was rated 7; there was much less intense green area seen than in the comparative example. Microscopic examination of the imaged receiver element showed a greatly increased distribution of imaged areas of green transfer layer having few or no flaps in comparison to those edges having flaps at the edges.

Example 7

This example shows a result of exposing, treating, and separating with an adhesive, roller used for treating an assemblage of a blue-coated color filter receiver element with a red-colored donor element.

The treating used a roller with a diameter of 8 cm, rolled over the support layer of the donor element of the assemblage at 15 cm per second for a distance of 2 m while an apparent atmospheric pressure of about 10,000 Pa was maintained in the assemblage on the vacuum table. The 8 cm diameter roller was the same roller as in the previous example 6, modified by the use of adhesive tape which made the surface adhesive, with a somewhat higher durometer value. A 15 cm (6 inch) length of the roller cylinder, approximately in the middle, was wrapped with a length of 3M adhesive tape, adhesive side out ("Scotch Magic" office tape, ca. 1.9 cm wide, catalog #810, 3M Company, St. Paul, Minn.). The tape was angled so that each lap overlapped slightly (ca. 30%) of the previous lap, giving a spiral of one to two laps of the tape with the outer surface being adhesive. The Shore durometer (A scale unless otherwise specified; as in ASTM D2240-00) of the outer material was equal to or greater than 100. The adhesiveness measurement was much more than 10 seconds.

After completion of treating, the assemblage rested on the evacuated vacuum table more than 10 seconds before separating began. The separation was performed as in Comparative Example 1.

Macroscopic quality of the imaged receiver element where the adhesive side of the tape had rolled during the treatment, was rated 6 after separation; there was much less intense red area seen than in the comparative example for color transferred in the assemblage, or the areas of the receiver element that had not been treated by the adhesive-tape coated portion of the roller. The regularity of the improved areas was rather poor, due in part to the irregularities in the spiraled adhesive tape. The untreated areas (no treatment by roller portion having the adhesive tape) were rated 1 (bad). It is possible the adhesive tape thickness raised the roller off the assemblage in the areas not having the adhesive tape). The microscopic examination of the imaged receiver element showed a greatly increased distribution of imaged areas of red transfer layer having few or no flaps in comparison to those edges having flaps at the edges in the areas treated with the adhesive roller.

Example 8

This example shows a result of exposing, treating, and separating with an adhesive, non-compliant roller for treating. Unless specified, the conditions used were the same as in the previous example using adhesive tape.

The treating used a roller with a diameter of 8 cm, rolled over the support layer of the donor element of the assemblage at 15 cm per second for a distance of 2 m while an apparent atmospheric pressure of about 10,000 Pa was maintained in the assemblage on the vacuum table. The 8 cm diameter roller was made up of a hollow steel cylinder with an outer diameter of 8 cm, wrapped with a spiral of double sided tape.

The double sided tape was 3M brand high/low tack double coated tape, termed "removable repositionable tape", comprising a thin polyester carrier film about 5 cm (2 in) wide, having a permanent pressure sensitive acrylic 400 adhesive on the side adhered to the roller with an adhesion to stainless steel of 1.6 N/10 mm as tested by ASTM D-3330, and a releasable acrylic 1000 adhesive (as in POST-IT NOTES) on the other side with an adhesion to stainless steel of 0.5 N/10 mm as tested by ASTM D-3330 facing outward from the roller. The tape is termed "3M 400/1000 double-sided adhesive tape". The tape was applied in a spiral without overlap, having a width between closest edges of about 1 cm.

The Shore durometer (A scale unless otherwise specified; as in ASTM D2240-00) of the outer material was 100. The adhesiveness measurement was more than 5 seconds. The roller was approximately 226 cm (89 inches) long.

After completion of treating, the assemblage rested on the evacuated vacuum table more than 10 seconds before separating began. The separation was performed as in Comparative Example 1.

Macroscopic quality of the imaged receiver element after separation was rated 9; there was a minimal amount of intense red area seen than in the comparative example over large areas treated by the adhesive non-compliant portion of the roller. The areas treated without the adhesive tape (between the edges of the tape) were rated 1.

Example 9

This example shows a result of exposing, treating, and separating with both a compliant, adhesive roller, and a compliant, non-adhesive roller used for treating.

The treating first used a roller with a diameter of 8 cm, rolled over the support layer of the donor element of the assemblage at 22.5 cm per second for a distance of 2 m while an apparent atmospheric pressure of about 10,000 Pa was maintained in the assemblage on the vacuum table. The 8 cm diameter roller was made up of a solid steel cylinder with outer diameter of 4.8 cm. The solid steel cylinder was covered with a 1.6 cm thickness of rubber. The Shore durometer (A scale unless otherwise specified; as in ASTM D2240-00) of the outer material was 21. The adhesiveness measurement was greater than 2 second. The roller weighs 36 kg (80 lbs) and is approximately 226 cm (89 inches) long.

The treating then used a second roller with a diameter of 8 cm, rolled over the support layer of the donor element of the assemblage at 22.5 cm per second for a distance of 2 m while an apparent atmospheric pressure of about 10,000 Pa was maintained in the assemblage on the vacuum table. The 8 cm diameter second roller was made up of a hollow cylinder covered with a 8 mm thickness of rubber. The Shore durometer (A scale unless otherwise specified; as in ASTM D2240-00) of the outer material was 37.5. The adhesiveness measurement was less than or equal to 1 second. The roller is approximately 226 cm (89 inches) long.

The rollers were moved forward while maintaining a downward force on the assemblage. The rollers were held at a fixed distance from one another. After completion of treating, the assemblage rested on the evacuated vacuum table more than 10 seconds before separating began. The separation was performed as in Comparative Example 1.

Macroscopic quality of the imaged receiver element after separation was rated 7; there was much less intense green area seen than in the comparative example, although intensely green regions were evident as well as minimally green. Microscopic examination of the imaged receiver element showed a greatly increased distribution of imaged areas of green transfer layer having few or no flaps in comparison to those edges having flaps at the edges.

Comparative Example 10

This comparative example shows a result of exposing, treating, and separating with a compliant, adhesive roller used for simultaneous treating and separating.

This simultaneous treatment and separation uses the apparatus of the preceding example with two rollers in a fixed relationship on a single carrier. In this comparative example, the first roller is brought into contact with the assemblage and moved over the assemblage. The next roller is used to wind up the spent donor element, and is situated 5 cm above the imaged receiver element. Tension on the second roller during wind-up of the spent donor element serves to cause separation of the spent donor element from the imaged receiver element as the first roller moves off a given width of the assemblage. Thus, separation and treatment are accomplished entirely at the first roller.

The first roller with a diameter of 8 cm, rolled over the support layer of the donor element of the assemblage at 15 cm per second for a distance of 2 m while an apparent atmospheric pressure of about 10,000 Pa was maintained in the assemblage on the vacuum table. The 8 cm diameter roller was made up of a carbon fiber core with outer diameter of 4.8 cm. The carbon fiber core was covered with a 1.6 cm thickness of rubber. The Shore durometer (A scale unless otherwise specified; as in ASTM D2240-00) of the outer material was 19. The adhesiveness measurement was greater than 2 second. The roller weighs 11 kg (25 lbs) and is approximately 226 cm (89 inches) long.

The second roller with a diameter of 8 cm was made up of a hollow cylinder covered with a 8 mm thickness of rubber. The Shore durometer (A scale unless otherwise specified; as in ASTM D2240-00) of the outer material was 37.5. The adhesiveness measurement was less than or equal to 1 second. The roller is approximately 226 cm (89 inches) long. The rollers were moved forward while maintaining a downward force on the assemblage. The rollers were held at a fixed distance from one another. The second roller acted to roll up the spent donor element at the exit point of the assemblage from the first roller.

Macroscopic quality of the imaged receiver element after separation was rated 2; almost all areas of the imaged receiver element showed the intense green areas seen than in the first comparative example. Microscopic examination of the imaged receiver showed a one-to-one correspondence between areas of intense green and edges having flaps.

Example 11

This example shows a result of exposing, treating, and separating, when the treating is done with a rubber pad rubbed over the support layer of the assemblage.

The treating used a pad of neoprene rubber supplied by American Roller Company, WI. The high friction neoprene rubber was supplied as a circa 10 cm by 10 cm by 2.8 mm (4" by 4" by 0.110") sheet. The sheet was folded in half twice to form a pad 4 layers thick of circa 2.5 cm by 2.5 cm by 1.1 cm pad. The durometer measurement was 50 on the Shore A scale.

After exposing the assemblage of a blue-striped glass color filter receiver element with organic black mask and a donor element with a red transparent transfer layer, treatment was carried out by manually skidding the pad across the support layer of the assemblage at a speed of approximately 50 mm/sec for a distance of 10 cm while vacuum pressure was maintained in the assemblage on the vacuum table. The manual treatment was carried out with a medium force similar to wiping a table clean using a damp sponge. Treatment of separate areas of the assemblage were carried out at different angles of the skidding with respect to the first forward direction of movement of the laser head during the exposing that established the main edges of the stripes of colored transferred layer on the receiver element. Twenty-four separate areas were treated, at angles of skidding including 0, 45, 90, 135, and 180 degrees.

After completion of treating, the assemblage rested on the evacuated vacuum table more than 10 seconds before separating began. The separation was performed as in Comparative Example 1.

Macroscopic quality of the imaged receiver element in the treated areas after separation was rated 4; areas without the treatment by skidding were rated 1. There was a definitive difference in the areas that received treatment compared to those that did not receive treatment—the treated areas showed less intense red areas indicative of less flaps of red transfer material from the donor element. The regularity of the treated areas varied depending on angle, but all showed improvement over no treatment.

Example 12

This example shows a result of exposing, treating, and separating with a first adhesive, compliant roller for the treating and a second compliant roller used for separation. The first roller and second roller are simultaneously moved over the assemblage in a fixed relationship, thereby carrying out treatment and separation at a single point in a span of less than one half second.

The assemblage used was a receiver element of a color filter glass sheet with an organic black mask, functionalized by thermal mass transfer with blue filters and red filters, and a donor element with a green pigmented transfer layer suitable for transferring green filters.

The treating used a roller with a diameter of 8 cm, rolled over the support layer of the donor element of the assemblage at 22.5 cm per second while an apparent reduced atmospheric pressure of as low as 10,000 Pa was maintained in the assemblage on the vacuum table. The 8 cm diameter roller was made up of a solid steel cylinder with outer diameter of approximately 4.8 cm. The steel cylinder was covered with a 1.6 cm thickness of adhesive black rubber. The Shore durometer (A scale unless otherwise specified; as in ASTM D2240-00) of the outer material was estimated to be 21. The adhesiveness measurement was 5 seconds. The roller weighs 36 kg (80 lbs) and is approximately 226 cm (89 inches) long. The roller was supplied by American Roller Company, Union Grove, Wis.

The mounting hardware used to move the treating roller also held a second roller used for separation at a fixed separation, capable of being independently rotated and lifted from or lowered to the assemblage. The hardware used for holding the rollers could be operated with either roller or both rollers in contact with the assemblage during movement of the hardware and rollers across the assemblage. The rollers were situated so that the smallest separation of the outer surfaces of the rollers was a gap of approximately 5.0 cm. In this example, the second roller was used to remove the spent donor element by rotating and wrapping the spent donor element around the second roller as the second roller was rolled over the assemblage in contact with the support layer after the first treating roller. Mild rotational tensioning of the second roller was used to keep the spent donor element in contact with the second roller or any previous laps of spent donor.

The second roller was 8 cm in diameter and hollow, made up of an inner hollow cylindrical roller with an 8 mm coating of rubber. The Shore A durometer reading of the rubber coating of the second roller was 37.5. The adhesiveness measurement was about 1 second.

The rollers were moved forward while maintaining a downward force on the assemblage due to each roller. Air was removed using the vacuum table during the movement; the vacuum was partially released as the second roller partially removed the spent donor element from contact with the imaged receiver element. The downward force on, and compliance of, the second roller tended to minimize infiltration of air into the space in the assemblage between the contact of the two rollers on the assemblage. Due to the close arrangement of the treating roller and the separating roller, the time between treating and separation was less than one half second.

Macroscopic quality of the imaged receiver element after separation was rated 5. In some areas of the imaged receiver there were minimal intense green areas, whereas in other areas of the imaged receiver there was intense green evident. Microscopic examination of the imaged receiver showed a one-to-one correspondence between areas of intense green and edges having flaps, likewise areas without intense green and no flaps.

Example 13

This example shows a result of exposing, treating, and separating with a single first adhesive, compliant roller for the treating in a first pass over the assemblage. A second treating is carried out in a second pass by the single first adhesive, compliant roller. A following second roller carried out separation, separated by a basically constant amount of time and of distance from the first roller. The second roller is basically at a fixed distance behind the first roller, and acts to take up the spent donor element by wrapping it around the second roller, and can be raised or lowered to contact the assemblage. The first roller and second roller were simultaneously moved over the assemblage during the second pass while at a fixed distance from each other.

The treating used a single first roller with a diameter of 8 cm, rolled over the support layer of the donor element of the assemblage at 7.5 cm per second while an apparent reduced atmospheric pressure of as low as 10,000 Pa was maintained in the assemblage on the vacuum table. The 8 cm diameter roller was made up of a solid steel cylinder with outer diameter of approximately 4.8 cm. The steel cylinder was covered with a 1.6 cm thickness of adhesive black rubber. The Shore durometer (A scale unless otherwise specified; as in ASTM D2240-00) of the outer material was estimated to be 21. The adhesiveness measurement was 5 seconds. The roller weighs 36 kg (80 lbs) and is approximately 226 cm (89 inches) long. The roller was supplied by American Roller Company, Union Grove, Wis.

The mounting hardware used to move the treating roller also held a second roller used for separation. The hardware used for holding the rollers could be operated with either roller or both rollers in contact with the assemblage during movement of the hardware and rollers across the assemblage. The smallest separation of the outer surfaces of the rollers was a gap of approximately 5.0 cm. In this example, the second roller was used to remove the spent donor element by wrapping the spent donor element around the second roller as the second roller was rolled over the assemblage in contact with the support layer after the first treating roller.

The second roller was 8 cm in diameter and hollow, made up of an inner hollow cylindrical roller with an 8 mm coating of rubber. The Shore A durometer reading of the rubber coating of the second roller was 37.5. The adhesiveness measurement was 1 second.

In a second pass over the assemblage after the first treating pass, the rollers were moved forward while maintaining a downward force on the assemblage due to each roller or due to the first roller only. The second pass was carried out in the same direction as the first pass. Air was removed by the vacuum table during the second pass movement; the vacuum was released as the second roller removed the spent donor element from contact with the imaged receiver element, or earlier when the second roller was elevated. When lowered, the downward force on, and compliance of, the second roller contacting the assemblage tended to minimize infiltration of air into the space in the assemblage between the contact of the two rollers on the assemblage. Due to the close arrangement of the treating roller and the separating roller, the time between contact by the first roller and contact by the second roller was short.

After completion of treating by the first pass of the first roller, the second pass was performed approximately 60 seconds later with the combination of the first and second roller. At the start of the second pass, both rollers were set down on the assemblage and a period of approximately 15 seconds elapsed while the vacuum holes on the second roller contacted the support layer and adhesion of the spent donor element support layer due to that vacuum pressure was allowed to build up. After sufficient vacuum pressure built up to allow the second roller to grip the support layer, both rolls were then moved while rotating forward at 25.0 cm/sec for approximately 7.6 cm (3 inches) while maintaining a downward force on the assemblage, with the second roller winding up the support layer while in contact with the assemblage, thereby carrying out separation. Both rolls were then stopped for a period of approximately 5 seconds, and during this period, the second roller was lifted up from the assemblage carrying the spent donor element off the imaged receiver element so that a gap opened which narrowed towards the first roller. Both rollers were then moved forward once again at 25.0 cm/sec for a distance of 2 m with the first roller rolling over the assemblage and the second roller winding up the support layer.

Macroscopic quality of the imaged receiver after separation was rated. For the initial part of the imaged receiver in which both rollers were down during the separation step, a rating of 3 was given. For the rest of the imaged receiver, in which the first roller was down and the second roller was up during the second pass, a rating of 7 was given (1=bad, 10=excellent). There were relatively more intense areas of green in the regions of the imaged receiver that had undergone separation with 2 rollers contacting the imaged receiver. Microscopic examination of the imaged receiver showed a one-to-one correspondence between areas of intense green and edges having flaps, likewise areas without intense green and no flaps.

Example 14

This example shows the result of exposing, and separating using a two roller system used for the separating step. The first roller is a compliant/adhesive roller rolling on the assemblage, wherein the spent donor element separates from the imaged receiver element as the donor element and receiver element pass out of the effect of the first roller. The second roller is a non-compliant, non-adhesive roller taking up the spent donor element. The second roller was elevated above the imaged receiver element, so that the spent donor element and imaged receiver element are held out of contact with one another for some distance, typically from where they are in contact at the pinch point of the exit of the first roller due to necessary tensioning of the second roller to take up any slack spent donor element between the first roller and the second roller. Treatment does not occur in the example where the spent donor element and the imaged receiver element are out of contact for a majority or all of the distance between the first roller and the second roller because separation occurs at the first roller. This configuration of two separate rollers was useful to allow adjustment of variables such as tensioning of the spent donor element between the two rollers, and the elevation of the second donor above the imaged receiver element that achieves an adjustable angle between the spent donor and imaged receiver as they exit the pinch point of the first roller.

The first roller had a diameter of 8 cm and was made up of a carbon fiber core with an outer 16 mm coating of rubber; total weight of 11 kg (25 lbs). The Shore A durometer reading of the rubber coating of the first roller was 19. The second 8 cm diameter roller was made up of a hollow cylinder with a 8 mm coating of rubber. The Shore A durometer reading of the rubber coating of the second roller was 37.5.

The first roller is rolled over the support layer of the donor element of the assemblage at 15.0 cm/sec for a distance of 2 m while vacuum pressure was maintained in the assemblage on the vacuum table. The first roller was moved forward while maintaining a downward force exerted by the weight of the roller. The second roller, held by the same apparatus as the first roller, was moved forward while lifted off the assemblage by 50 mm. As rolling occurs, the vacuum between the spent donor element and the imaged receiver element was broken at the first roller location and separation immediately occurred. The second roller winds up the spent donor element after separation.

Macroscopic quality of the imaged receiver after separation was rated 2 (1=bad, 10=excellent), with almost all areas of the imaged receiver exhibiting intense green color. Microscopic examination of the imaged receiver showed a one-to-one correspondence between areas of intense green and edges having flaps.

Example 15

This example shows a result of exposing, treating, and separating the assemblage, with treatment provided by a compliant, adhesive roller, with and without an applied rotational torque. The increasing rotational torque applied to the treating roller causes an increasing force on the support layer of the assemblage causing increased moving of the position of the support layer from a first position to a second position relative to the receiver element along a direction substantially parallel to the support layer and the force, causing an improved decreased area of flaps.

The assemblage used in each of the three separate cases described in this example was a receiver element of a color filter glass sheet with an organic black mask, functionalized by thermal mass transfer with blue filters and red filters, and a donor element with a green pigmented transfer layer suitable for transferring green filters. The treating used a roller with a diameter of 8 cm, rolled over the support layer of the donor element of the assemblage at 5 cm per second for a distance of 2 m while an apparent atmospheric pressure of about 10,000 Pa was maintained in the assemblage on the vacuum table.

The 8 cm diameter roller was made up of a hollow steel cylinder with an inner diameter of 5 cm and an outer diameter of 6 cm. The hollow steel cylinder was covered with a 1 cm thickness of rubbery adhesive material referred to as "Super Polyurethane". The Shore durometer (A scale unless otherwise specified; as in ASTM D2240-00) of the outer material was 20. The adhesiveness measurement (time to uncover from 12 to 6 o'clock) was approximately 130 seconds. The roller weighs approximately 21 kg (46 lbs) and is approximately 226 cm (89 inches) long. The roller was supplied by Polymag Tek Inc., Rochester, N.Y.

The roller was moved forward with a force downwards towards the assemblage of approximately 21 kilopascals (3 psi). After completion of treating, the assemblage rested on the evacuated vacuum table more than 10 seconds before separating began. The separation was performed as in Comparative Example 1.

In case one of this example, the treating roller was allowed to freely rotate as it was moved over the assemblage, so as to move rotationally almost without friction the same distance as the apparatus holding the roller. The roller was mounted on its axle using ball bearings. The roller when not engaged onto the assemblage could be rotated by hand at similar speeds to its travel over the assemblage and would continue rotating for a considerable period of time, demonstrating a low rotational friction between the roller and the apparatus holding the roller.

In case two of this example, using another identically made and exposed assemblage, the treating roller was subjected to greater rotational torque by braking. Rotational torque was introduced by installing elastomeric sleeves on the axle of the roller, each sleeve touching both the axle and the roller, with a prescribed amount of friction between the treatment roller and the axle. As the apparatus of the roller moved the roller forward, the braked roller thereby tended to move the support layer forward a greater distance with respect to the receiver element fixed on the vacuum table than an unbraked, freely rotating roller would.

The force necessary to overcome the rotational drag of the roller was measured and found to correspond to approximately 0.45 Newton-meters (4 inch lbs) of rotational torque in case 2. This implies a normalized in plane shear load of approximately 7.4 N/m (0.042 lbf/in).

In case three of this example, using another identically made and exposed assemblage, the treating roller was subjected to even greater rotational torque by braking. Rotational torque was introduced by installing elastomeric sleeves on the axle of the roller, touching both the axle and the roller, with a prescribed amount of friction between the treatment roller and the axle, and by mechanical rubbing of the surface of the treatment roller. As the apparatus of the roller moved the roller forward, the braked roller thereby tended to move the support layer forward a greater distance with respect to the receiver element fixed on the vacuum table than an unbraked, freely rotating roller would, or than the roller of case two would.

The force necessary to overcome the rotational drag of the roller in the third case was measured and found to correspond to approximately 3.6 Newton-meters (32 inch lbs) of rotational torque. This implies a normalized in plane shear load of approximately 59 N/m (0.338 lbf/in).

Macroscopic quality of imaged receiver in the first case after separation was rated 7, the imaged receiver in the second case was rated 8, and imaged receiver in the third case was rated 9 (1=bad, 10=excellent), with all areas of the imaged receivers exhibiting little (and progressively less) intense green color. Microscopic examination of the imaged receiver showed a one-to-one correspondence between areas of intense green and edges having flaps. It was readily apparent that increasing the braking progressively improved the straightness of the edges of the transferred material and decreased the amount of flaps apparent on the transferred material on the imaged receiver element.

Example 16

This example shows a result of exposing, treating, and separating the assemblage, with treatment provided by a non-compliant, adhesive roller.

The treating used a solid steel roller with a diameter of 6 cm and a length of 86 in. No elastomeric material was used over the steel roller to give a compliant roller. The roller was spiral-wrapped with 4 in. wide 3M 400/1000 double-sided adhesive tape, wrapped with the lower adhesive layer facing out. The wrapping was done so that the edges of the double-sided adhesive tape overlapped by ½" along the length of the roller, so that no part of the assemblage would be exposed to the outer steel. The durometer measurement of the roller was equal to or greater than 100 on the Shore A scale.

Treatment was performed by rolling the roller over the donor element of the exposed assemblage at a speed of 150 mm/sec for a distance of 2 m while vacuum pressure was maintained in the assemblage on the vacuum table.

After completion of treating, the assemblage rested on the evacuated vacuum table more than 10 seconds before separating began. The separation was performed as in comparative example 1.

Macroscopic quality was compared for the areas of the imaged receiver that had received the adhesive treatment (the relatively thin bands having two layers of adhesive tape overlapped angling across the assemblage, and areas where the roller was thicker and came into contact each revolution) versus areas of the receiver that had not (single-wrapped areas, left elevated above the assemblage). The adhesive-treated areas were clearly visible and followed the spiral wrapping pattern of the double-sided tape on the roller. The portions of the imaged receiver that had experienced treatment with the spiral adhesive wraps were rated 8, there was consistently minimal intense red area seen, whereas the portions with no adhesive treatment were rated 1 (1=bad, 10=excellent), with consistent intense red.

What is claimed is:

1. In a method of using a donor element in a radiation-induced thermal transfer process to form an image comprising:
   providing an assemblage of a donor element and a receiver element, the donor element comprising:
   a support layer; and
   a transfer layer having one side thereof disposed adjacent the support layer and the other side of the transfer layer opposite the one side disposed adjacent the receiver element;
   image-wise exposing the assemblage to radiation whereby at least a portion of the image-wise exposed transfer layer is transferred to the receiver element to form a transferred layer; and
   separating the donor element from the receiver element, thereby revealing the image on the receiver element,
   the improvement comprising treating the assemblage after the exposing step and before the separating step by providing relative movement between the support layer and the receiver element.

2. The method of claim 1 wherein the treating step is performed by moving the position of the support layer from a first position to a second position relative to the receiver element along a direction substantially parallel to the support layer.

3. The method of claim 2 wherein the moving step is performed by contacting a surface of the support layer opposite the one side of the transfer layer with a treating surface selected from the group consisting of an adhesive surface, a compliant surface, or a combination thereof.

4. The method of claim 3 wherein the contacting step is performed by moving a roller having the treating surface thereon over the support layer.

5. The method of claim 4 wherein the roller comprises a tensioning device selected from the group consisting of a brake and a drive.

6. The method of claim 5 wherein the roller applies an in-plane shear load of greater than 5 Newtons per meter to the support layer.

7. The method of claim 1 wherein the treatment step is completed at least 0.1 seconds before the separating step is begun.

8. The method of claim 1 wherein the treatment step is completed at least 3 seconds before the separating step is begun.

9. The method of claim 1 wherein the treatment step is completed at least 15 seconds before the separating step is begun.

10. The method of claim 1, wherein the receiver element comprises a colorless transparent material contacting an opaque matrix contacting a colored transparent material.

11. The method of claim 1, wherein:
    the transferred layer at the completion of the exposing step is connected to the transfer layer by a connector created from the transfer layer,
    and further wherein the treating step breaks the connector to provide at least one of a donor element flap connected to the transfer layer and a receiver element flap connected to the transferred layer.

12. The method of claim 11 wherein the receiver element flap is smaller in volume than the donor element flap.

13. The method of claim 1 wherein:
    the treating is carried out at different times for different areas of the assemblage, and
    at a time where there exist at least one treated area and at least one area to be treated of the assemblage, there exists an unseparated area within a treated area, the unseparated area at least 1 cm distant from every area to be treated.

14. The method of claim 13, wherein the unseparated area is at least 3 cm distant from every area to be treated.

15. The method of claim 13, wherein the unseparated area is at least 10 cm distant from every area to be treated.

16. The method of claim 1 wherein the treating step is performed by moving the position of the support layer from a first position to a second position relative to the receiver element along a direction away from the receiver element, followed by moving the position of the support layer from the second position to a third position relative to the receiver element along a direction towards the receiver element.

17. The method of claim 1 wherein the treating step is performed by moving the position of the support layer from a first position to a second position relative to the receiver element along a direction toward the receiver element, followed by moving the position of the support layer from the second position to a third position relative to the receiver element along a direction away from the receiver element.

* * * * *